United States Patent
Baek et al.

(10) Patent No.: US 10,503,390 B2
(45) Date of Patent: Dec. 10, 2019

(54) ELECTRONIC DEVICE AND PHOTOGRAPHING METHOD

(71) Applicant: Samsung Electronics Co., Ltd., Suwon-si, Gyeonggi-do (KR)

(72) Inventors: Woohyun Baek, Suwon-si (KR); Seungwoo Lee, Yongin-si (KR); Hoseong Jeon, Suwon-si (KR); Hyoungsun Ji, Suwon-si (KR); Mingyu Kim, Seongnam-si (KR); Gyushik An, Gwangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/759,368

(22) PCT Filed: Sep. 7, 2016

(86) PCT No.: PCT/KR2016/009990
§ 371 (c)(1),
(2) Date: Mar. 12, 2018

(87) PCT Pub. No.: WO2017/052113
PCT Pub. Date: Mar. 30, 2017

(65) Prior Publication Data
US 2018/0181275 A1    Jun. 28, 2018

(30) Foreign Application Priority Data
Sep. 22, 2015   (KR) .................. 10-2015-0133710

(51) Int. Cl.
*H04N 5/225*    (2006.01)
*G06F 3/0488*    (2013.01)
(Continued)

(52) U.S. Cl.
CPC ............ *G06F 3/0488* (2013.01); *G06F 3/048* (2013.01); *G06F 3/0416* (2013.01); *G06F 3/147* (2013.01);
(Continued)

(58) Field of Classification Search
None
See application file for complete search history.

(56) References Cited

U.S. PATENT DOCUMENTS 9,185,062 B1    11/2015   Yang et al.
9,479,696 B1 *  10/2016   Miller .................... G06Q 50/01
(Continued)

FOREIGN PATENT DOCUMENTS

AU       2015100713 A4    6/2015
EP       2 169 946 A2     3/2010
(Continued)

OTHER PUBLICATIONS

European Search Report dated Oct. 26, 2018; European Appln. No. 16848839.3-1208 / 3352449.
(Continued)

*Primary Examiner* — Twyler L Haskins
*Assistant Examiner* — Dwight Alex C Tejano
(74) *Attorney, Agent, or Firm* — Jefferson IP Law, LLP

(57) ABSTRACT

An electronic device, according to various embodiments of the present invention, comprises: an image sensor; a display configured to acquire a user input; and a processor functionally connected to the image sensor and the display, wherein, when the user input has a first input time, the processor displays, via the display, image information acquired from means of the images sensor, and when the user input has a second input time, the processor may be configured to perform an operation of storing the image information.

15 Claims, 17 Drawing Sheets

(51) Int. Cl.
*G06F 3/048* (2013.01)
*H04N 5/77* (2006.01)
*G06F 3/041* (2006.01)
*H04N 5/232* (2006.01)
*G06F 3/147* (2006.01)
*G09G 5/26* (2006.01)
*G09G 5/02* (2006.01)
*H04N 9/67* (2006.01)

(52) U.S. Cl.
CPC ........... *G09G 5/26* (2013.01); *H04N 5/23216* (2013.01); *H04N 5/23293* (2013.01); *H04N 5/77* (2013.01); *G09G 5/02* (2013.01); *G09G 2340/06* (2013.01); *H04N 5/23229* (2013.01); *H04N 9/67* (2013.01)

(56) References Cited

U.S. PATENT DOCUMENTS

| | | |
|---|---|---|
| 2006/0062382 A1 | 3/2006 | Ronkainen |
| 2008/0295015 A1 | 11/2008 | Liu et al. |
| 2010/0020221 A1* | 1/2010 | Tupman ............... G06F 3/04883 348/333.01 |
| 2010/0053342 A1* | 3/2010 | Hwang ................ H04N 5/2259 348/207.99 |
| 2010/0062803 A1 | 3/2010 | Yun et al. |
| 2011/0261228 A1 | 10/2011 | Peng et al. |
| 2012/0050575 A1 | 3/2012 | Choe et al. |
| 2013/0057713 A1* | 3/2013 | Khawand ............... H04N 5/232 348/208.1 |
| 2013/0215295 A1* | 8/2013 | Baek .................. H04N 5/23293 348/240.99 |
| 2013/0222671 A1 | 8/2013 | Tseng et al. |
| 2013/0225236 A1 | 8/2013 | Lee et al. |
| 2014/0375862 A1 | 12/2014 | Kim et al. |
| 2015/0033129 A1 | 1/2015 | Cho et al. |
| 2015/0042852 A1 | 2/2015 | Lee et al. |
| 2015/0135108 A1 | 5/2015 | Pope et al. |
| 2015/0229849 A1* | 8/2015 | Shin .................... H04N 1/00307 348/207.1 |
| 2016/0180845 A1* | 6/2016 | Kim ....................... G06F 3/167 348/211.2 |
| 2017/0070670 A1* | 3/2017 | Kwon ................ H04N 5/23222 |

FOREIGN PATENT DOCUMENTS

| | | |
|---|---|---|
| EP | 2 424 224 A2 | 2/2012 |
| EP | 2 631 777 A1 | 8/2013 |
| EP | 2 830 297 A1 | 1/2015 |
| JP | 2007-096983 A | 4/2007 |
| KR | 10-2009-0070051 A | 7/2009 |
| KR | 10-2013-0094633 A | 8/2013 |
| KR | 10-2014-0028432 A | 3/2014 |
| KR | 10-2014-0147462 A | 12/2014 |
| KR | 10-2015-0018308 A | 2/2015 |
| WO | 2013/173838 A2 | 11/2013 |

OTHER PUBLICATIONS

European Search Report dated Jul. 24, 2018; European Appln No. 16848839.3-1208/3352449.

* cited by examiner

ELECTRONIC DEVICE AND PHOTOGRAPHING METHOD

TECHNICAL FIELD

Various embodiments relate to a portable electronic device configured to photograph in response to a user input.

BACKGROUND ART

It is common for an image sensor to be installed in an electronic device (e.g., smartphone). The electronic device can acquire image data using the image sensor and show an image in a display by processing the image data. Namely, the electronic device can support a function of showing an image in advance of photographing.

DISCLOSURE OF INVENTION

Technical Problem

A specific time is required for driving a camera in an electronic device, and accordingly a user may not be able to quickly capture a scene of a desired moment.

Various embodiments can provide an electronic device that captures a scene rapidly based on a user input. The electronic device according to various embodiments can provide a preview screen for a user to capture a scene desired by the user based on the user input.

Solution to Problem

An electronic device according to various embodiments may include an image sensor, a display configured to acquire a user input, and a processor functionally connected to the image sensor and the display. The processor is configured to, if the user input has a first input time, display image information acquired from the image sensor through the display, and, if the user input has a second input time, perform an operation of storing the image information.

A method for operating an electronic device may include the operations of acquiring a user input through a display; in response to acquiring the user input, displaying, through the display, image information acquired through an image sensor if the user input has a first input time; and storing the image information if the user input has a second input time.

Advantageous Effects of Invention

An electronic device and a method according to various embodiments can provide instantly a photo desired by a user by providing a preview screen or performing a photographing operation based on a user input.

The electronic device and the method according to various embodiments can provide greater convenience for the user by photographing rapidly or providing a preview screen based on a photographing command of the user.

MODE FOR THE INVENTION

Figure 1:
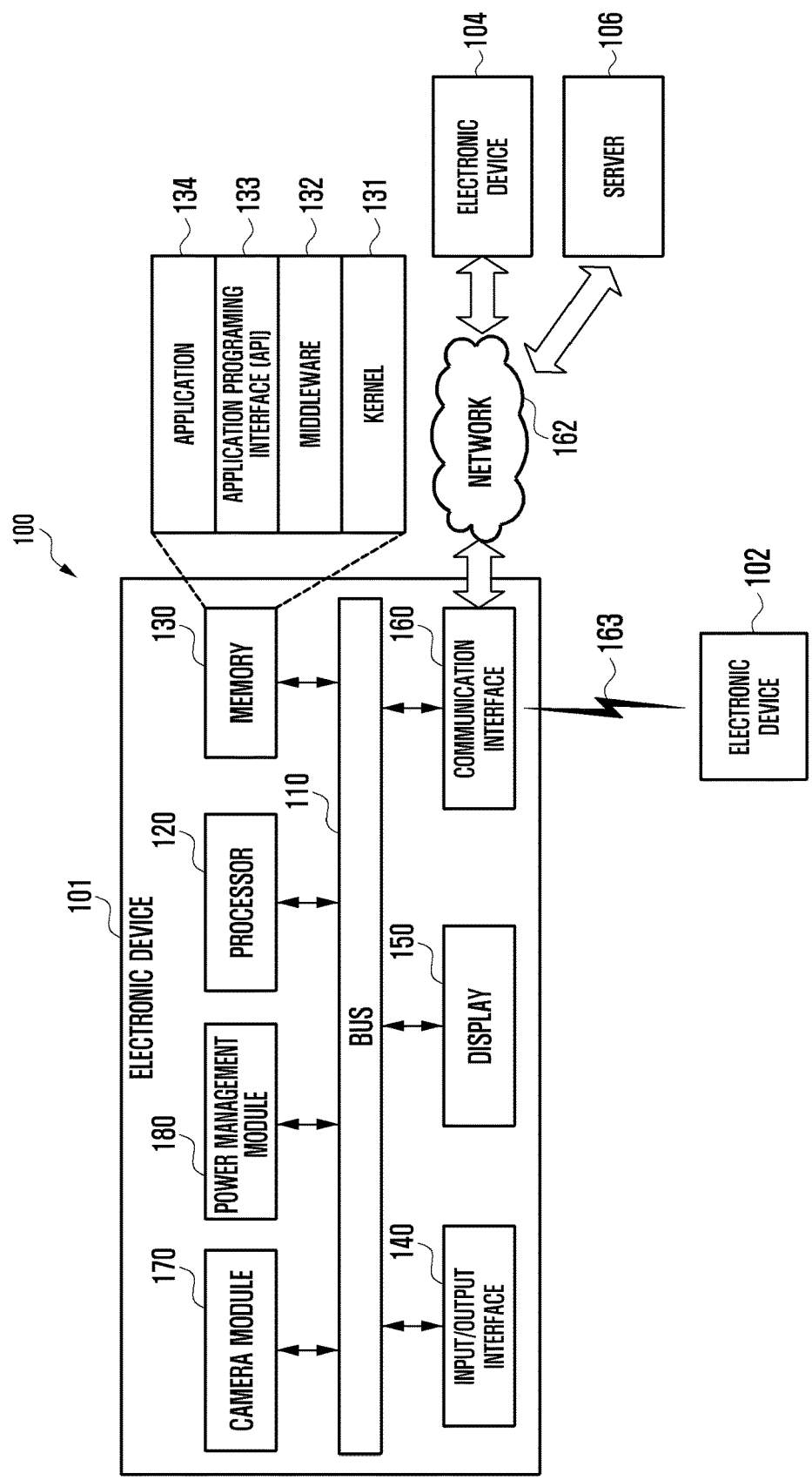
FIG. 1 is a block diagram illustrating a configuration of an electronic device according to various embodiments.

The present disclosure will be described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, step, operation, constituent element, component or a combination thereof, but may not be construed to exclude the existence of or a possibility of the addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device may indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, and a wearable device (e.g., a Head-Mounted-Device (HMD) such as electronic glasses; electronic clothes; an electronic bracelet; an electronic necklace; an electronic accessary; an electronic tattoo; and a smart watch).

According to some embodiments, the electronic device may be a smart home appliance having a communication function. The smart home appliance may include at least one of a television (TV), a Digital Video Disk (DVD) player, an audio player, an air conditioner, a cleaner, an oven, a microwave oven, a washing machine, an air cleaner, a set-top box, a TV box (e.g., Samsung HomeSync™, Apple TV™, or Google TV™), game consoles, an electronic dictionary, an electronic key, a camcorder, and an electronic frame.

According to some embodiments, the electronic device may include at least one of various types of medical devices (e.g., Magnetic Resonance Angiography (MRA), Magnetic Resonance Imaging (MRI), Computed Tomography (CT), a scanner, an ultrasonic device and the like), a navigation device, a global navigation satellite system (GNSS) receiver, an Event Data Recorder (EDR), a Flight Data Recorder (FDR), a vehicle infotainment device, electronic equipment for a ship (e.g., a navigation device for ship, a gyro compass and the like), avionics, a security device, a head unit for a vehicle, an industrial or home robot, an Automatic Teller Machine (ATM) of financial institutions, a Point Of Sale (POS) device of shops, and a device for internet of things (IoT) (e.g., a fire alarm, various sensors, electric or gas meter units, a sprinkler, a thermostat, a streetlamp, a toaster, sport outfits, a hot-water tank, a heater, a boiler and the like).

According to some embodiments, the electronic device may include at least one of furniture or a part of a building/structure, an electronic board, an electronic signature receiving device, a projector, and various types of measuring devices (e.g., a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (e.g., an artificial intelligence electronic device) which uses an electronic device.

FIG. 1 illustrates a network environment 100 including an electronic device 101 according to various embodiments of the present disclosure. Referring to FIG. 1, the electronic device 101 may include various components including a bus 110, a processor 120, a memory 130, an input/output interface 140, a display 150, a communication interface 160, and a power management module 170.

The bus 110 may be a circuit connecting the above described components and transmitting communication (e.g., a control message) between the above described components.

The processor 120 may receive commands from other components (e.g., the memory 130, the input/output interface 140, the display 150, the communication interface 160, or the power management module 170) through the bus 110, analyze the received commands, and execute calculation or data processing according to the analyzed commands.

The memory 130 stores commands or data received from the processor 120 or other components (e.g., the input/output interface 140, the display 150, the communication interface 160, or the power management module 170) or generated by the processor 120 or other components. The memory 130 may store a software and/or a program. For example, the program may include a kernel 131, middleware 132, an Application Programming Interface (API) 133, and an application program (or an application) 134. At least part of the kernel 131, the middleware 132 or the API 133 may refer to an operating system (OS).

The kernel 131 controls or manages system resources (e.g., the bus 110, the processor 120, or the memory 130) used for executing an operation or function implemented by the remaining other programming modules, for example, the middleware 132, the API 133, or the application 134. Further, the kernel 131 provides an interface for accessing individual components of the electronic device 101 from the middleware 132, the API 133, or the application 134 to control or manage the components.

The middleware 132 performs a relay function of allowing the API 133 or the application 134 to communicate with the kernel 131 to exchange data. Further, in operation requests received from the application 134, the middleware 132 performs a control for the operation requests (e.g., scheduling or load balancing) by using a method of assigning a priority, by which system resources (e.g., the bus 110, the processor 120, the memory 130 and the like) of the electronic device 101 can be used, to the application 134.

The API 133 is an interface by which the application 134 can control a function provided by the kernel 131 or the middleware 132 and includes, for example, at least one interface or function (e.g., command) for a file control, a window control, image processing, or a character control.

According to various embodiments, the application 134 may include a Short Message Service (SMS)/Multimedia Messaging Service (MMS) application, an email application, a calendar application, an alarm application, a health care application (e.g., application measuring quantity of exercise or blood sugar) or an environment information application (e.g., application providing information on barometric pressure, humidity or temperature). Additionally, or alternatively, the application 134 may be an application related to an information exchange between the electronic device 101 and an external electronic device (e.g., electronic device 104). The application 134 related to the information exchange may include, for example, a notification relay application for transferring particular information to the external electronic device or a device management application for managing the external electronic device.

For example, the notification relay application may include a function of transmitting notification information generated by another application (e.g., an SMS/MMS application, an email application, a health care application or an environment information application) of the electronic device 101 to the external electronic device (e.g., electronic device 104). Additionally, or alternatively, the notification relay application may receive notification information from, for example, the external electronic device 104, and provide the received notification information to the user. The device management application may manage (e.g., install, remove, or update) at least a part of functions of the electronic device. For example, the device management application may turn on/off the external electronic device (or some components of the external electronic device), control a brightness of the display of the external electronic device or communicate with the electronic device 101, an application executed in the external electronic device 104, or a service (e.g., call service or message service) provided by the external electronic device 104.

According to various embodiments, the application 134 may include an application designated according to an attribute (e.g., type of electronic device) of the external electronic device 104. For example, when the external electronic device 104 is an MP3 player, the application 134 may include an application related to music reproduction. Similarly, when the external electronic device 104 is a mobile medical device, the application 134 may include an application related to health care. According to an embodiment, the application 134 may include at least one of an application designated to the electronic device 101 and an application received from an external electronic device (e.g., server 106 or electronic device 104).

The input/output interface 140 transmits a command or data input from the user through an input/output device 140 (e.g., a sensor, a keyboard, or a touch screen) to the processor 120, the memory 130, the communication interface 160, or the display control module 150 through, for example, the bus 110. For example, the input/output interface 140 may provide data on a user's touch input through a touch screen to the processor 120. Further, the input/output interface 140 may output a command or data received, through, for example, the bus 110, from the processor 120, the memory 130, the communication interface 160, or the power management module 170 through the input/output device (e.g., a speaker or a display). For example, the input/output interface 140 may output voice data processed through the processor 120 to the user through the speaker.

The display 150 may include, for example, liquid crystal display (LCD), flexible display, transparent display, light-emitting diode(LED) display, organic light-emitting diode (OLED) display, microelectromechanical systems (MEMS) display, or electronic paper display. The display 150 may visually offer, for example, various contents (e.g., text, image, video, icon, symbol, etc.) to users. The display 150 may include a touch screen and receive, for example, a touch, gesture, proximity, or hovering input using an electronic pen or a user's body. According to an embodiment, the display 150 may be one or more displays. For example, the display 150 may be included in the electronic device 101 or included in an external device (e.g., the electronic device 102 or 104) having a wired or wireless connection with the electronic device 101, thus outputting information offered by the electronic device 101 to users.

According to an embodiment, the display 150 may be attachable to or detachable from the electronic device 101. For example, the display 150 may include an interface which can be mechanically or physically connected with the electronic device 101. According to an embodiment, in case the display 150 is detached (e.g., separated) from the electronic device 101 by a user's selection, the display 150 may receive various control signals or image data from the power management module 170 or the processor 120, e.g., through wireless communication.

The communication interface 160 may establish communication between the electronic device 101 and any external device (e.g., the first external electronic device 102, the second external electronic device 104, or the server 106). For example, the communication interface 160 may be connected with a network 162 through wired or wireless communication and thereby communicate with any external device (e.g., the first external electronic device 102, the second external electronic device 104, or the server 106).

According to an embodiment, the electronic device 101 may be connected with the first external electronic device 102 and the second external electronic device 104 without using the communication interface 160. For example, based on at least one of a magnetic sensor, a contact sensor, a light sensor, and the like that is equipped in the electronic device 101, the electronic device 101 may sense whether at least one of the first and second external electronic devices 102 and 104 is contacted with at least part of the electronic device 101, or whether at least one of the first and second external electronic device 102 and 104, respectively, is attached to at least part of the electronic device 101.

Wireless communication may use, as cellular communication protocol, at least one of LTE (long-term evolution), LTE-A (LTE Advance), CDMA (code division multiple access), WCDMA (wideband CDMA), UMTS (universal mobile telecommunications system), WiBro (Wireless Broadband), GSM (Global System for Mobile Communications), and the like, for example. A short-range communication 163 may include, for example, at least one of Wi-Fi, Bluetooth, Near Field Communication (NFC), Magnetic Secure Transmission or near field Magnetic data Stripe Transmission (MST), and Global Navigation Satellite System (GNSS), and the like. The GNSS may include at least one of, for example, a Global Positioning System (GPS), a Global navigation satellite system (Glonass), a Beidou Navigation Satellite System (hereinafter, referred to as "Beidou"), and Galileo (European global satellite-based navigation system). Hereinafter, the "GPS" may be interchangeably used with the "GNSS" in the present disclosure. Wired communication may include, for example, at least one of USB (universal serial bus), HDMI (high definition multimedia interface), RS-232 (recommended standard-232), POTS (plain old telephone service), and the like. The network 162 may include telecommunication network, for example, at least one of a computer network (e.g., LAN or WAN), internet, and a telephone network.

The first and second external electronic devices 102 and 104 may be identical to, or different from, the electronic device 101. According to an embodiment, the first and second external electronic devices 102 and 104 may include, for example, a plurality of electronic devices. According to an embodiment, the server 106 may include a single server or a group of servers. According to various embodiments, all or part of operations executed in the electronic device 101 may be executed in other electronic device(s), such as the first and second electronic devices 102 and 104 or the server 106.

According to an embodiment, in case the electronic device 101 is required to perform a certain function or service automatically or by request, the electronic device 101 may request another device (e.g., the electronic device 102 or 104 or the server 106) to execute instead, or additionally at least part, of at least one or more functions associated with the required function or service. The requested device may execute the requested function and deliver the result of execution to the electronic device 101. Then, the electronic device 101 may offer the required function or service, based on the received result or by processing the received result. For the above, cloud computing technology, distributed computing technology, or client-server computing technology may be used, for example.

The camera module 170 is a device capable of obtaining still images and moving images. According to an embodiment, the camera module 170 may include at least one image sensor (e.g., a front sensor or a rear sensor), a lens, an ISP (Image Signal Processor), or a flash (e.g., LED, xenon lamp, etc.).

The power management module 180 may manage electric power of the electronic device 101. According to an embodiment, the power management module 180 may include a PMIC (Power Management Integrated Circuit), a charger IC (Integrated Circuit), or a battery or fuel gauge. For example, when the power of the electronic device 101 is turned on, the power management module 180 (e.g., the PMIC) may supply electric power of the battery to other elements (e.g., the processor 120). Also, the power management module 180 may receive a command from the processor 120 and manage the supply of power in response to the command For example, in response to a command received from the processor 120, the power management module 180 may supply electric power to the display 140, the camera module 170, and the like. Meanwhile, the PMIC may have a wired and/or wireless charging type. The wireless charging type may include, for example, a magnetic resonance type, a magnetic induction type, or an electromagnetic type. An additional circuit for wireless charging may be further used such as a coil loop, a resonance circuit, or a rectifier. The battery gauge may measure the residual amount of the battery and a voltage, current or temperature in a charging process. The battery may include, for example, a rechargeable battery and/or a solar battery.

Figure 2:
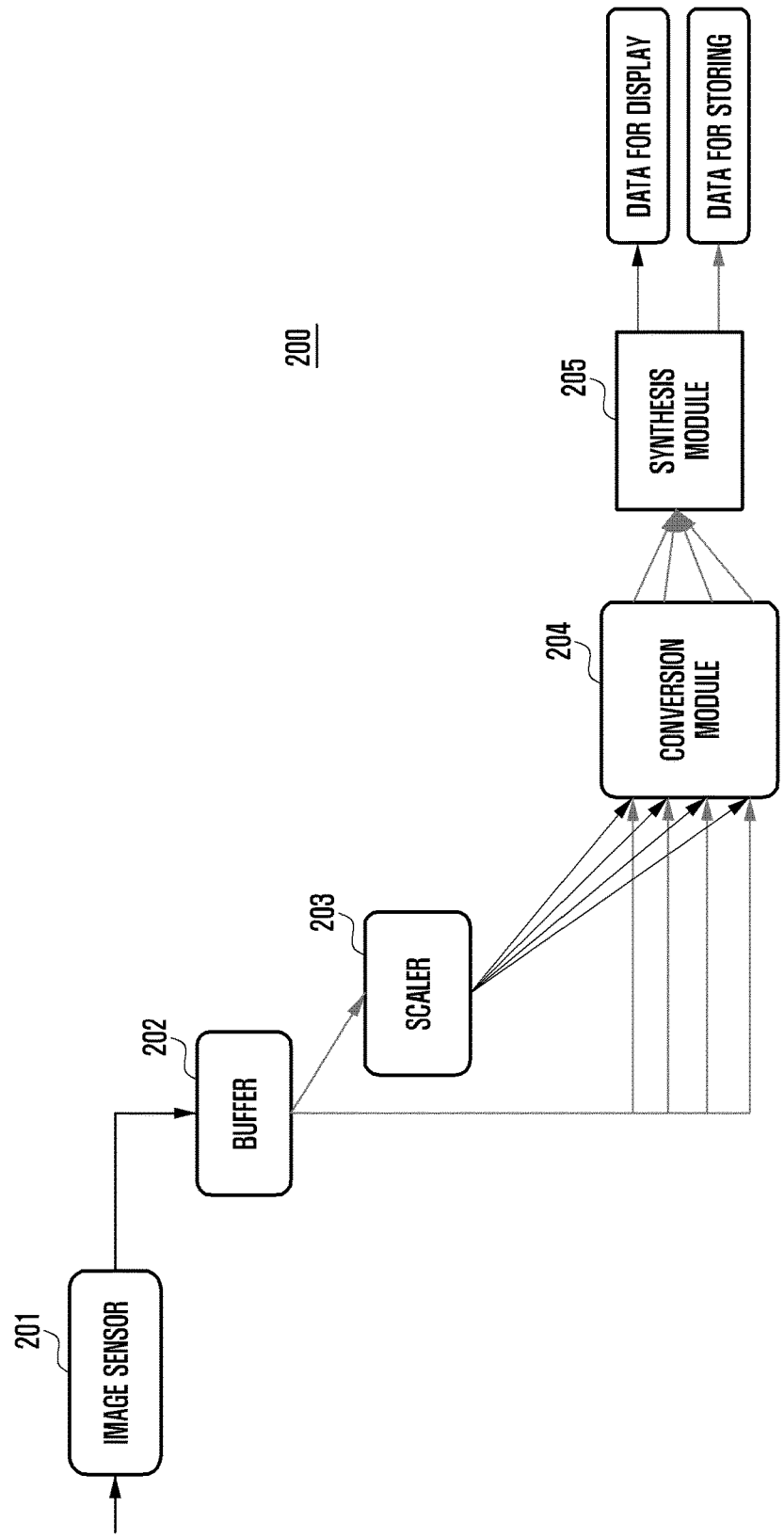
FIG. 2 is a block diagram illustrating a configuration of an electronic device according to various embodiments.

FIG. 2 is a block diagram illustrating a configuration of an electronic device 200 (e.g., electronic device 101) according to various embodiments. The electronic device 200 may include an image sensor 201, buffer 202, scaler 203, conversion module 204, and synthesis module 205.

The image sensor 201 can receive electric power from a power management module 180 and generate image data using the electric power. For example, the image sensor 201 can generate the image data in a Bayer pattern method and the generated image data may be referred to as Bayer data. Further, the image sensor 201 can process the Bayer data to RGB data (e.g., generating RGB data by performing an interpolation operation for the Bayer data) and transmit the RGB data to the buffer 202. Each pixel of the RGB data may have an R (red) value, G (green) value, and B (blue) value.

The scaler 203 can perform a function of reducing the size of the RGB data. For example, the scaler 203 can receive a plurality of RGB data items from the buffer 202, reduce the number of pixels (components of each of RGB data items) from 20 mega to 2 mega and transmit the reduced RGB data items to an ISP 204. Such a function of the scaler 203 may be performed by an image signal processor (ISP).

The conversion module 204 can change a color expression of image data from RGB to YUV. For example, the conversion module 204 can receive a plurality of scaled down RGB data items from the scaler 203, generate YUV data by changing the color expression of each received RGB data item from RGB to YUV, and transmit the YUV data to the synthesis module 205. Subsequently, the conversion module 204 can receive a plurality of RGB data items from the buffer 202, generate YUV data by changing the color expression of each received RGB data item from RGB to YUV, and transmit the YUV data to the synthesis module 205. Hereinafter, for convenience in description, the former YUV data (namely, data scaled down and converted from RGB to YUV) may be referred to as "first YUV data" and the latter YUV data (namely, data converted from RGB to YUV without scaling down) may be referred to as "second YUV data". The function of conversion module 204 may be performed by an ISP.

The synthesis module 205 can receive a plurality of first YUV data items from the conversion module 204, generate display data by synthesizing the plurality of first YUV data items to one first YUV data item, and transmit the display data to a display. Subsequently, the synthesis module 205 can receive a plurality of second YUV data items from the conversion module 204, synthesize the plurality of received second YUV data items to one second YUV data item, generate storage data by encoding the synthesized second YUV data item, and transmit the storage data to a memory. Such a function of the synthesis module 205 may be performed by an application processor (AP) (e.g., processor 120).

Figure 3:
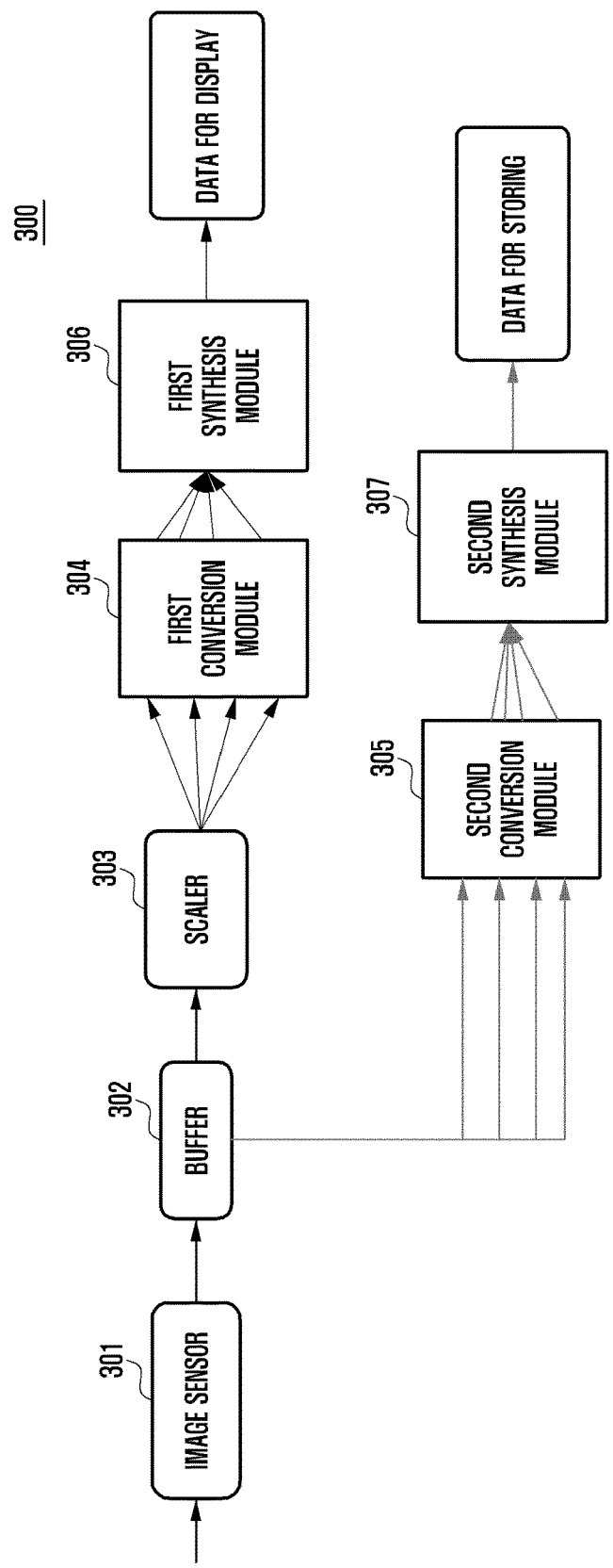
FIG. 3 is a block diagram illustrating a configuration of an electronic device according to various embodiments.

FIG. 3 is a block diagram illustrating a configuration of an electronic device 300 (e.g., electronic device 101) according to various embodiments. The electronic device 300 may include an image sensor 301, buffer 302, scaler 303, first conversion module 304, second conversion module 305, first synthesis module 306, and second synthesis module 307.

The image sensor 301 can receive electric power from a power management module 180 and generate Bayer data using the electric power. Further, the image sensor 301 can process the Bayer data to RGB data and transmit the Bayer data to the buffer 320.

The scaler 303 can receive a plurality of RGB data items from the buffer 302, reduce the number of pixels (components of RGB data), and transmit the reduced RGB data to the first conversion module 304. Such a function of the scaler 303 may be performed by an ISP.

The first conversion module 304 can receive RGB data from the scaler 303, generate first YUV data by changing a color expression of the RGB data to YUV, and transmit the first YUV data to the first synthesis module 306. Such a function of the first conversion module 304 may be performed by an ISP.

The second conversion module 305 can receive RGB data from the buffer 302, generate second YUV data by converting a color expression of the RGB data to YUV, and transmit the second YUV data to the second synthesis module 307. Such a function of the second conversion module 305 may be performed by an ISP.

The first synthesis module 306 can generate display data by synthesizing a plurality of first YUV data items to one first YUV data item, and transmit the display data to a display. Such a function of the first synthesis module 306 may be performed by an AP.

The second synthesis module 307 can synthesize the plurality of received second YUV data items for one second YUV data item, generate storage data by encoding the synthesized second YUV data item, and transmit the storage data to a memory. Such a function of the second synthesis module 307 may be performed by an AP.

An electronic device according to various embodiments may include an image sensor, a display configured to acquire a user input, and a processor functionally connected to the image sensor and the display. The processor may be configured to, if the user input has a first input time, display image information acquired from the image sensor through the display, and, if the user input has a second input time, perform an operation of storing the image information.

The processor may be configured to identify an attribute of the user input acquired through the display and to perform a function corresponding to the identified attribute, and the identified attribute may include at least one of information indicating a direction, information indicating time, and information related to an object contacting or hovering over the display.

The processor may be configured to identify an attribute of the user input acquired through the display and to control the image sensor based setting information corresponding to the identified attribute; and the identified attribute may include at least one of information indicating a direction, information indicating time, and information related to an object contacting or hovering over the display.

The processor may be configured to drive the image sensor in response to a first user input acquired through the display and to terminate the driving of the image sensor if an attribute of a second user input acquired from the display satisfies a predetermined condition.

The processor may be configured to terminate the driving of the image sensor if a direction of the second user input is opposite to a direction of the first user input.

The processor may be further configured to, in response to a stop of a gesture on the display, transmit a first drive command to the image sensor, receive first data from the image sensor as a response to the first drive command, generate processing data by processing the first data, and control the display to display the processing data by converting the processing data to an image.

The processor may be further configured to, in response to a release of the gesture, transmit a second drive command to the image sensor, receive second data from the image sensor as a response to the second drive command, generate first processing data and second processing data having a greater capacity than the first processing data by processing the second data, control the display to display the first processing data by converting the first processing data to an image, encode the second processing data, and store the encoded data.

Generating the first processing data by the processor may comprise reducing the size of the received data and converting a color expression of the received data from RGB to YUV. Generating the second processing data by the processor may comprise a procedure of converting the color expression of the received data from RGB to YUV. Further, the processor may be configured to transmit the first processing data or encoded data of the first processing data to an external device in response to the release of the gesture.

If the electronic device includes a flashlight, the processor may be configured to control the flashlight to emit light at the time of transmitting the second drive command An electronic device according to various embodiments of the present invention may include an image sensor, a display, an input device configured to acquire a user gesture, and a processor functionally connected to the image sensor and the display. The processor may be configured to, in response to a release of a gesture on the display, transmit a drive command to the image sensor, receive data from the image sensor as a response to the drive command, generate first processing data and second processing data having a greater capacity than the first processing data by processing the data, control the display to display the first processing data by conversion to an image, encode the second processing data, and store the encoded data. Generating the first processing data by the processor may comprise reducing the size of the received data and converting a color expression of the received data from RGB to YUV, and generating the second processing data by the processor may comprise converting the color expression of the received data from RGB to YUV.

The input device may include a key formed in at least one part of a touch panel installed in the display or in an area physically separated from the display.

An electronic device according to various embodiments of the present invention may include an input device configured to acquire a user gesture; an image sensor configured to generate data in response to light; a display configured to display an image corresponding to the data; a communication module configured to communicate with an external device; and a processor configured to control the image sensor, the display, and the communication module in response to the gesture received from the input device. The processor may be configured to control the display to display a user interface screen in order to transmit a message to and receive a message from an external device, in response to a release of a gesture received from the input device while displaying the user interface screen; to transmit a drive command to the image sensor; to receive data from the image sensor in response to the drive command; to generate processing data by processing the data; and to transmit the processing data or encoded data of the processing data to the external device through the communication module.

An electronic device according to various embodiments may include an image sensor, a display configured to acquire a user input, and a processor functionally connected to the image sensor and the display. The processor can be configured so that the image sensor operates in a first mode if the user input has a first attribute, and the image sensor operates in a second mode if the user input has a second attribute. The processor can control the image sensor to perform a first function in the first mode and a second function in the second mode. The first function may be photographing a still image and the second function may be photographing a moving image.

Figure 4:
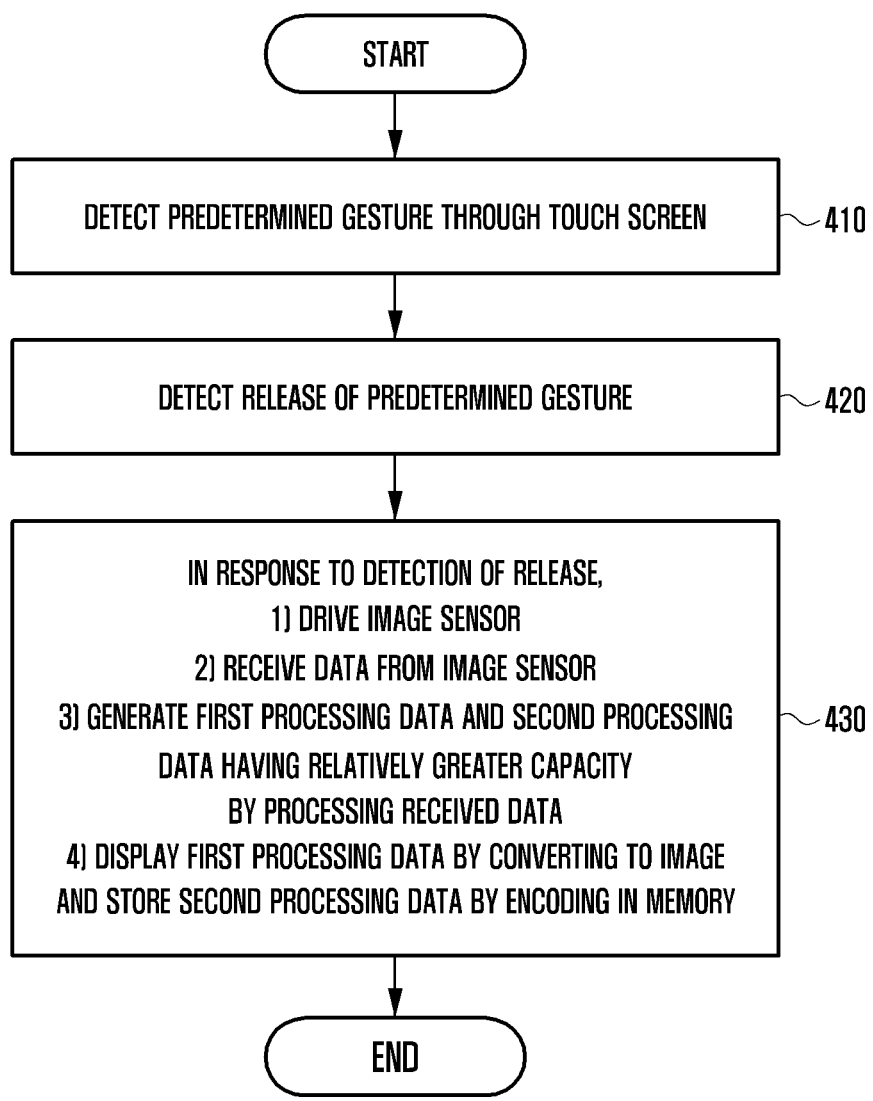
FIG. 4 illustrates a photographing method according to an embodiment.

FIG. 4 illustrates a photographing method according to an embodiment. The photographing method can be performed when a display of an electronic device 101 is in a switched-off state (e.g., when a display is an inactive state because a power supply from a power management module 180 is blocked), or when a predetermined screen (e.g., lock screen, home screen) or an execution screen of a specific application (e.g., instant message (IM) application) is displayed in a display.

With reference to FIG. 4, at operation 410, the processor 120 may detect a predetermined gesture through a touch screen (e.g., display 150).

At operation 420, the processor 120 may detect a release of the predetermined gesture. The release may mean a release of contact between an object (e.g., finger or pen) and a touch screen or a release of a hovering object. The processor 120 can identify the release of the predetermined gesture as a photographing command In response to the photographing command, the electronic device 101 (e.g., electronic device 200 or electronic device 300) can perform the following operation 430.

First, the image sensor is driven. For example, if a photographing command is generated by a user, the processor 120 can transmit a command for supplying power to a power management module 180, and the power management module 180 can supply electric power to the image sensor in response to reception of the command Further, the processor 120 can transmit a drive command (capture command) to the image sensor, and the image sensor can generate data and transmit the data to the processor 120 in response to reception of the drive command Further, if the display 150 is in a switched-off state, the processor 120 can control the power management module 180 to supply power to the display 150, and the power management module 180 can supply an electric power to the display 150.

The processor 120 can receive data (e.g., RGB data) from the image sensor. The processor 120 can generate first processing data (e.g., first YUV data) and second processing data (e.g., second YUV data) having a greater capacity than the first processing data by processing the data.

The processor 120 can transmit the first processing data as display data to the display 150. Accordingly, the display 150 can display the display data in a screen by converting the display data to an image. Further, the processor 120 can encode the second processing data and store the encoded data in the memory 130.

Further, the processor 120 can guide a user to a photographing timing. For example, if a photographing command is generated by the user, the processor 120 can wake up from a sleep state. The woken up processor 120 can control to supply power to the display 150 and the image sensor of the camera module 170. Further, the processor 120 can load setting information in an internal memory of the camera module 170. Subsequently, the processor 120 can command the image sensor to drive and simultaneously command a flashlight to emit light. Alternatively, the processor 120 can control the flashlight to emit light in response to receiving data (e.g., RGB data) from the image sensor as a response to the drive command Additionally or as an alternative of at least one of the display operation and the storage operation, the processor 120 can encode the image data (e.g., first YUV data) and transmit the encoded data to an external device (e.g., electronic device 102, electronic device 104, or server 106) through the communication interface 160. For example, if a screen displayed before generation of the photographing command is an instant messenger (IM) screen, the processor 120 can control the communication interface 160 to transmit the encoded data to an electronic device of an interlocutor of the user. The counterpart device can display the encoded data in a screen by decoding the encoded data.

Figure 5:
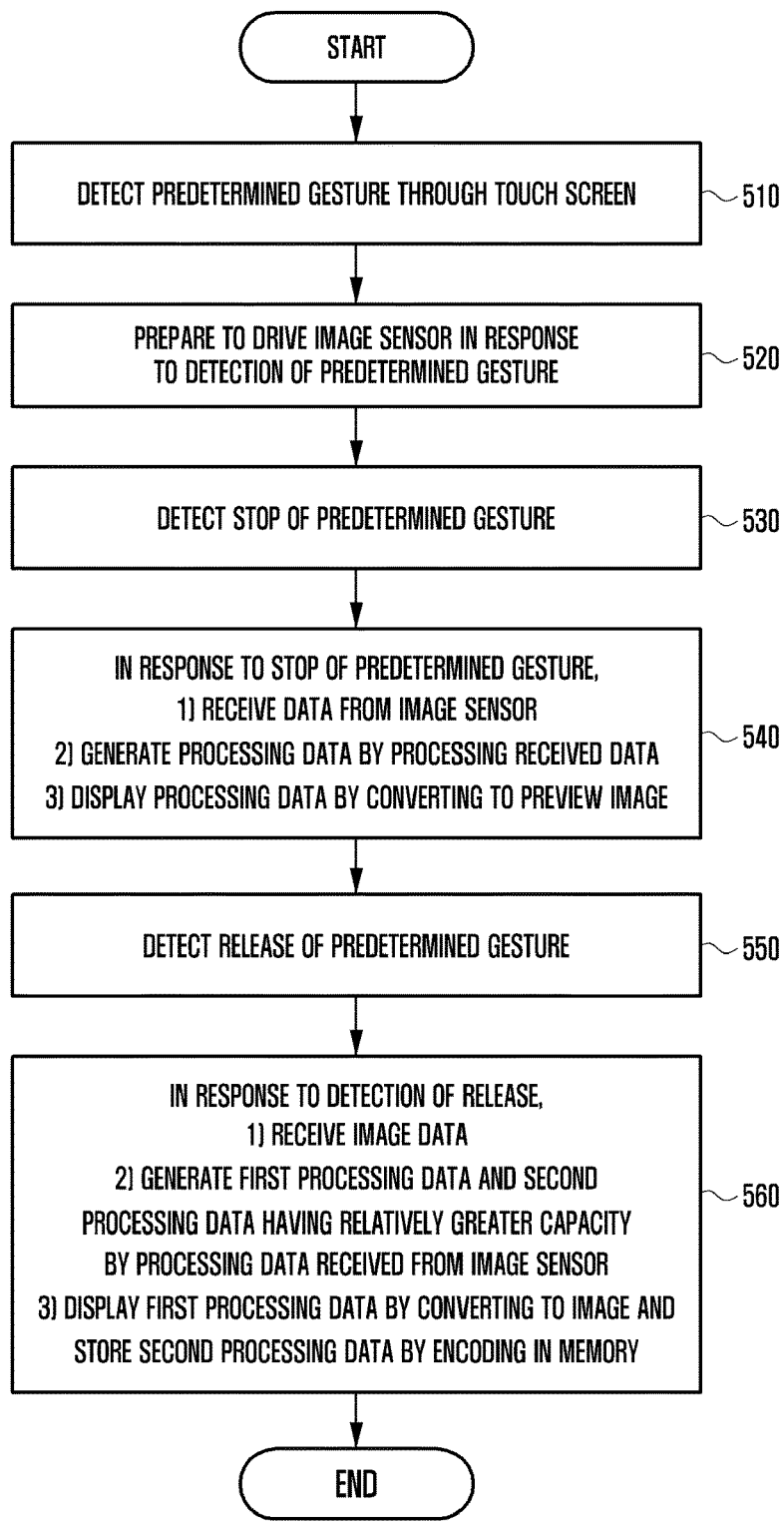
FIG. 5 illustrates a photographing method according to another embodiment.

FIG. 5 illustrates a photographing method according to another embodiment. The photographing method can be performed when a display 150 of an electronic device 101 is in a switched-off state or a predetermined screen is displayed in the display 150.

With reference to FIG. 5, at operation 510, the processor 120 may detect a predetermined gesture through a touch screen (e.g., display 150).

At operation 520, the processor 120 may prepare to drive an image sensor (e.g., image sensor 201 or image sensor 301) in response to the detection of the predetermined gesture. For example, if the predetermined gesture is detected, the processor 120 can command a power management module 180 to supply electric power to the image sensor. Accordingly, the power management module 180 can supply the electric power to the image sensor. Further, the processor 120 can transmit camera setting information (e.g., AE (Auto Exposure), AWB (Auto White Balance), AF (Auto Focus), ISO (International Organization for Standardization) sensitivity, shutter speed, aperture value, and zoom magnification) stored in a memory 130 to an internal memory of a camera module 150. An operation of the camera module 150 (e.g., operation of generating data of image sensor) can be performed based on the setting information stored in the internal memory.

At operation 530, the processor 120 may detect a stop of the predetermined gesture. Here, the stop may mean a stop of an object (e.g., finger or pen) moving in a state of contacting (or hovering over) a touch screen. The processor 120 can identify the stop as a preview command.

The electronic device 101 can perform the following operation 540 in response to the preview command First, the processor 120 can transmit a drive command to the image sensor and receive image data (e.g., RGB data) from the image sensor as a response to the drive command Further, if the display 150 is in a switched-off state, the processor 120 can command the power management module 180 to supply power to the display 150, and the power management module 180 can supply power to the display 150 accordingly.

The processor 120 can generate processing data (e.g., first YUV data) by processing the received data.

The processor 120 can transmit the processing data as display data to the display 150. Accordingly, the display 150 can convert the display data to a preview image and display the preview image.

At operation 550, the processor 120 may detect a release of the predetermined gesture. Here, the release may mean a release of contact between an object (e.g., finger or pen) and a touch screen, or a release of a hovering object. The processor 120 can identify the release of the predetermined gesture as a photographing command The electronic device 101 can perform the following operation 560 in response to the photographing command First, the processor 120 can transmit a drive command to the image sensor and receive image data (e.g., RGB data) from the image sensor as a response to the drive command.

The processor 120 can generate first processing data (e.g., first YUV data) and second processing data (e.g., second YUV data) having a greater capacity than the first processing data by processing the data received from the image sensor.

The processor 120 can transmit the first processing data as display data to the display 150. Accordingly, the display 150 can convert the display data to an image and display the image. Further, the processor 120 can encode the second processing data and store the encoded data in the memory 130.

Further, the processor 120 can guide a user to a photographing timing. For example, the processor 120 can command the image sensor to drive and simultaneously command a flashlight to emit light. Alternatively, the processor 120 can control the flashlight to emit light in response to receiving data (e.g., RGB data) from the image sensor as a response to the drive command.

Additionally or as an alternative of at least one of the display operation and the storage operation, the processor 120 can encode image data (e.g., first YUV data) and transmit the encoded data to an external device (e.g., electronic device 102, electronic device 104, or server 106) through a communication interface 160.

Figure 6:
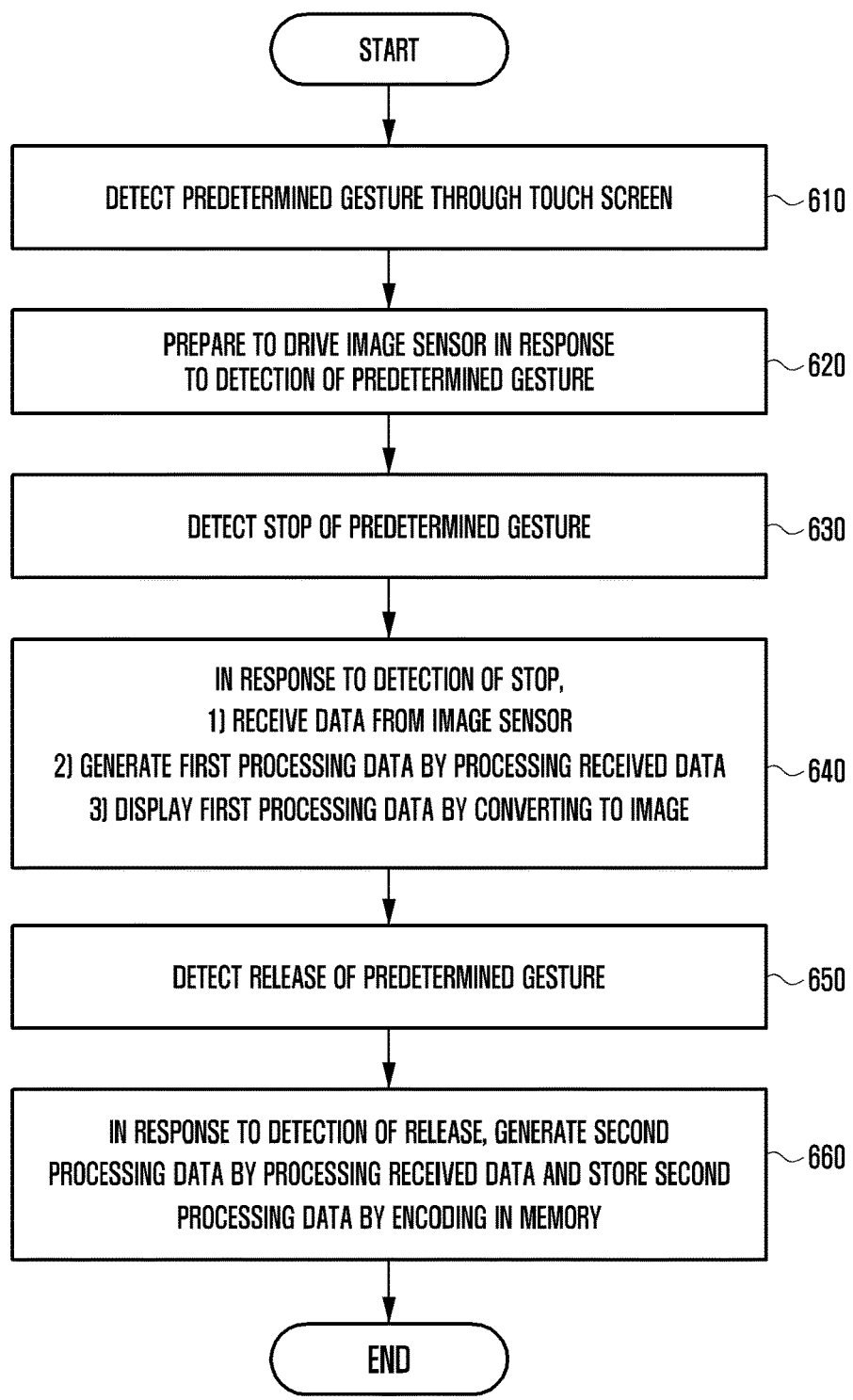
FIG. 6 illustrates a photographing method according to another embodiment.

FIG. 6 illustrates a photographing method according to another embodiment. The photographing method can be performed when a display 150 of an electronic device 101 is in a switched-off state or a predetermined screen is displayed in the display 150.

With reference to FIG. 6, at operation 610, the processor 120 may detect a predetermined gesture through a touch screen (e.g., display 150).

At operation 620, the processor 120 may prepare to drive an image sensor in response to the detection of the predetermined gesture. For example, if the predetermined gesture is detected, the processor 120 can command a power management module 180 to supply electric power to the image sensor. Accordingly, the power management module 180 can supply the electric power to the image sensor.

At operation 630, the processor 120 may detect a stop of the predetermined gesture. Here, the stop may mean a stop of an object (e.g., finger or pen) moving in a state of contacting (or hovering over) a touch screen. The processor 120 can identify the stop as a preview command.

The electronic device 101 can perform the following operation 640 in response to the preview command.

First, the processor 120 can transmit a drive command to the image sensor and receive image data (e.g., RGB data) from the image sensor as a response to the drive command Further, if the display 150 is in a switched-off state, the processor 120 can command the power management module 180 to supply power to the display 150, and the power management module 180 can supply power to the display 150 accordingly.

The processor 120 can generate first processing data (e.g., first YUV data) by processing the data received from the image sensor.

The processor 120 can transmit the first processing data as display data to the display 150. Accordingly, the display 150 can convert the display data to an image and display the image.

Further, the processor 120 can guide a user to a photographing timing. For example, the processor 120 can command the image sensor to drive and command a flashlight to emit light at the same time. Alternatively, the processor 120 can control the flashlight to emit light in response to receiving data from the image sensor as a response to the drive command.

At operation 650, the processor 120 may detect a release of the predetermined gesture. The release may mean a release of contact between an object (e.g., finger or pen) and a touch screen or a release of a hovering object. The processor 120 can identify the release of the predetermined gesture as a storage command.

At operation 660, the processor 120 can generate second processing data (e.g., second YUV data) by processing data received from the image and store encoded data in a memory 130 in response to the storage command.

Additionally or alternatively, the processor 120 can identify the release of the predetermined gesture as a transmission command In response to the transmission command, the processor 120 can encode the image data (e.g., first YUV data) and transmit the encoded data to an external device (e.g., electronic device 102, electronic device 104, or server 106) through a communication interface 160. Alternatively, the processor 120 can transmit the image data to the external device without encoding the image data.

Figure 7:
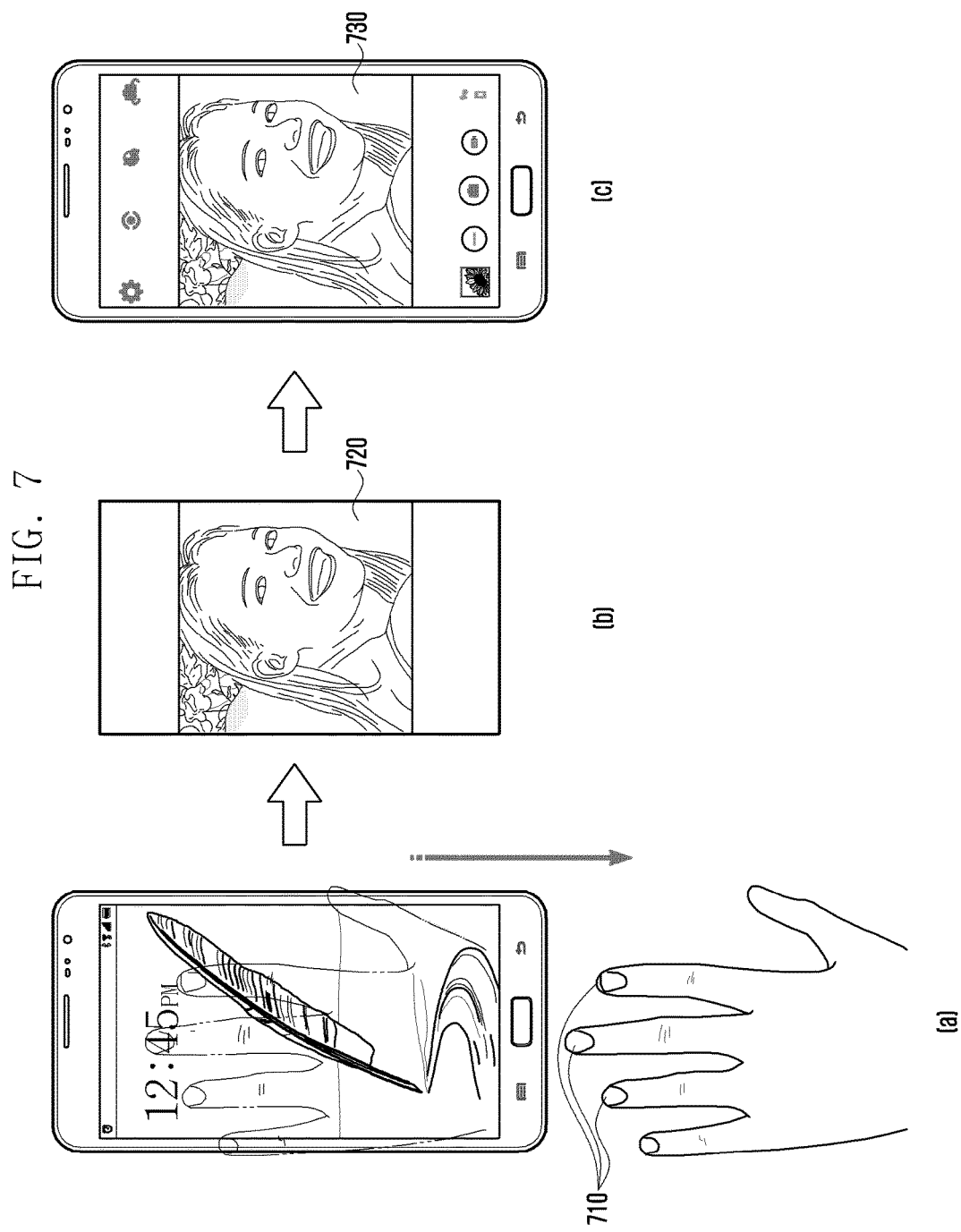
FIG. 7 illustrates a user interface screen of an electronic device for performing a photographing method according to various embodiments.

FIG. 7 illustrates a user interface screen of an electronic device for performing a photographing method according to various embodiments.

With reference to FIG. 7(a), an electronic device (e.g., smartphone) can identify a gesture of a specific object through a touch screen. Subsequently, the electronic device can determine whether the identified gesture is a photographing command. For example, if the identified gesture is an operation that three fingers 710 are released after moving in a predetermined direction (e.g., from top to bottom) in a state of contacting or hovering over a touch screen, the electronic device can determine that a photographing command is generated.

With reference to FIG. 7(b), the electronic device can acquire image data 720 (e.g., RGB data) from a camera in response to a photographing command With reference to FIG. 7(c), the electronic device can display an image 730 corresponding to the image data 720 in a touch screen. For example, the electronic device can generate first YUV data by resizing RGB data and changing a color expression from RGB to YUV. The electronic device can synthesize a plurality of first YUV data items for one YUV data item, convert the synthesized data to an image 730, and display the image 730 in the touch screen. Further, the electronic device can generate second YUV data by changing a color expression of the image data 720 from RGB to YUV in order to increase an encoding efficiency. The electronic device can synthesize a plurality of second YUV data items for one YUV data item and store the synthesized data in a memory by encoding.

Additionally or as an alternative of at least one of the display operation and the storage operation, the processor 120 can encode image data (e.g., first YUV data) and transmit the encoded data to an external device (e.g., electronic device 102, electronic device 104, or server 106) through a communication interface 160.

Figure 8:
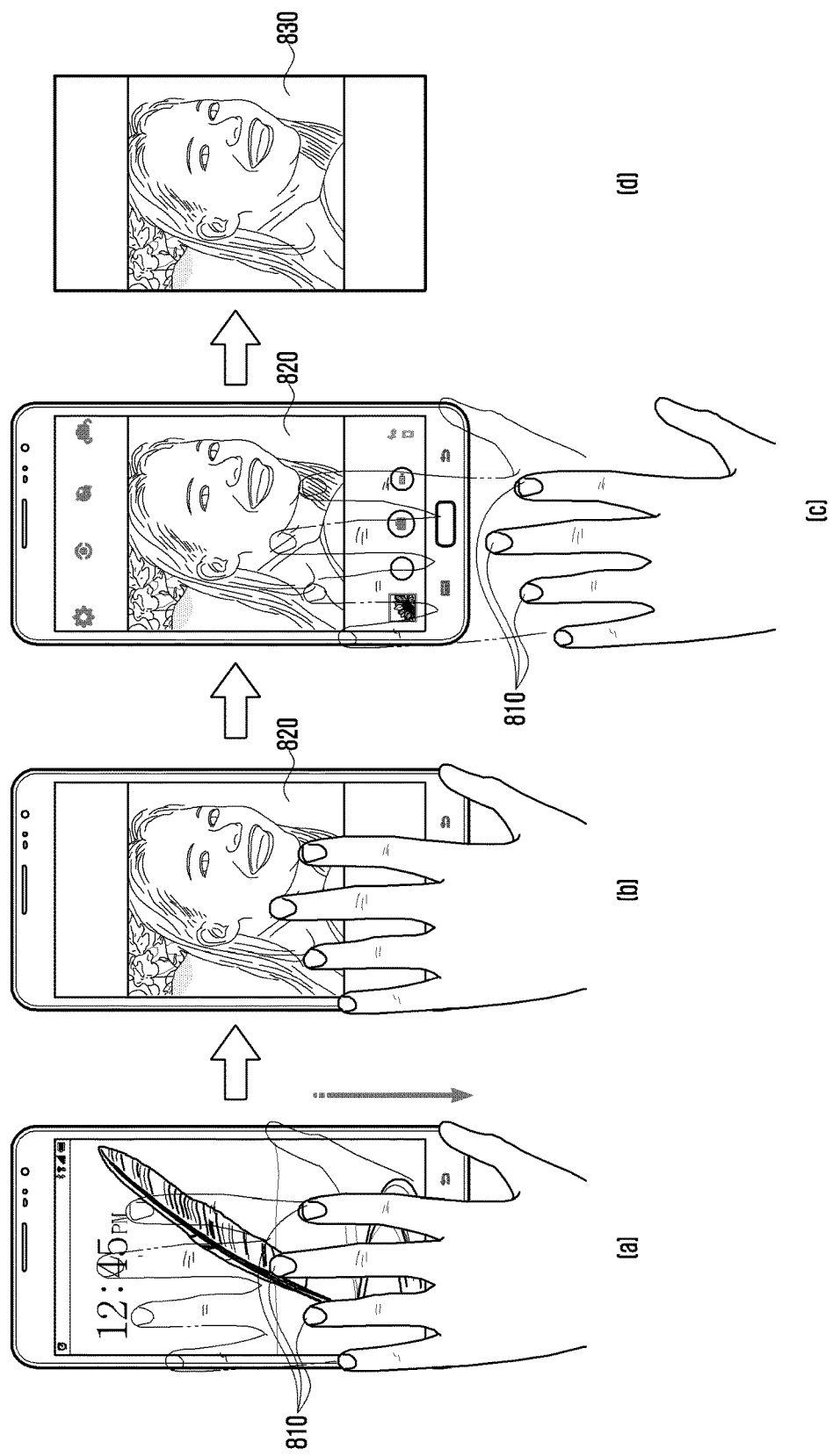
FIG. 8 illustrates a user interface screen of an electronic device for performing a photographing method according to various embodiments.

FIG. 8 illustrates a user interface screen of an electronic device for performing a photographing method according to various embodiments.

With reference to FIG. 8(a), an electronic device (e.g., smartphone) can identify a gesture of a specific object through a touch screen. Subsequently, the electronic device can determine whether the identified gesture is a preview command. For example, if the identified gesture is an operation that three fingers 710 are released after moving in a predetermined direction (e.g., from top to bottom) in a state of contacting or hovering over a touch screen, the electronic device can determine that a preview command is generated.

With reference to FIG. 8(b), the electronic device can acquire image data (e.g., RGB data) from a camera and display an image 820 corresponding to the image data in a touch screen in response to the preview command With reference to FIG. 8(c), a user may release three fingers 810 from the touch screen while the image 820 is being displayed.

With reference to FIG. 8(d), the electronic device can store image data 830 in a memory by processing the image data in response to the release of the fingers. For example, the electronic device can generate YUV data by changing a color expression of the image data from RGB to YUV. The electronic device can synthesize a plurality of YUV data items for one YUV data item and store the synthesized data in a memory.

Additionally or as an alternative of the storage operation, the processor 120 can encode image data (e.g., first YUV data) and transmit the encoded data to an external device (e.g., electronic device 102, electronic device 104, or server 106) through a communication interface 160.

Figure 9:
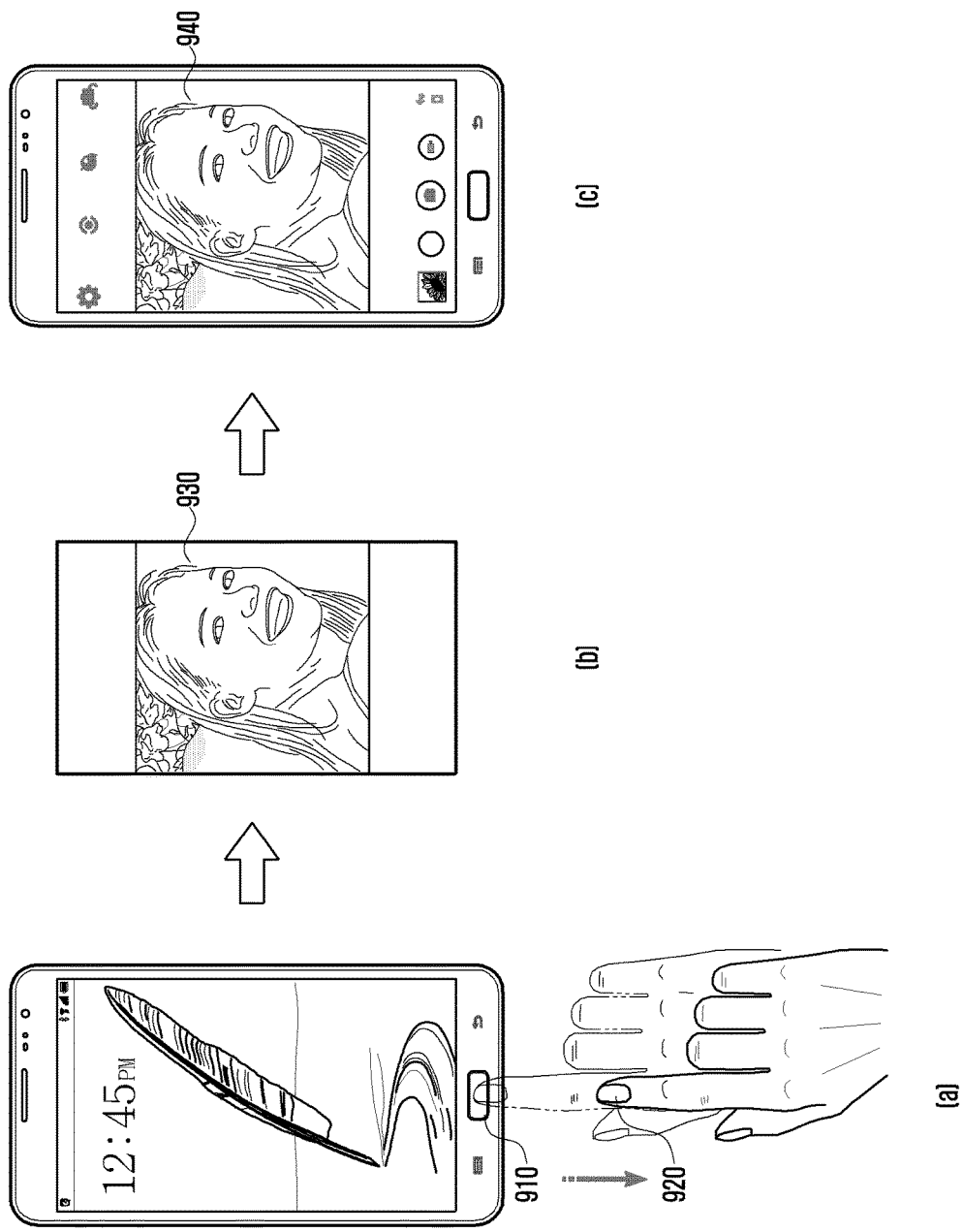
FIG. 9 illustrates a user interface screen of an electronic device for performing a photographing method according to various embodiments.

FIG. 9 illustrates a user interface screen of an electronic device for performing a photographing method according to various embodiments.

With reference to FIG. 9(a), the electronic device (e.g., smartphone) can identify a gesture of an object through a key formed in an area physically separated from a touch screen (e.g., touch key 910 formed under the touch screen) or from a partial area of the touch screen (e.g., part adjacent to the touch key 910). Subsequently, the electronic device can determine whether the identified gesture is a photographing command. For example, if the identified gesture is an operation that a finger 920 touched the touch key two times and then was taken off, the electronic device can determine that a photographing command is generated.

In response to the photographing command, the electronic device can acquire image data 930 shown in FIG. 9(b) from a camera and display an image 940 (refer to FIG. 9(c)) corresponding to the image data 930 in the touch screen. Additionally or as an alternative of the display operation, the processor 120 can encode the image data (e.g., YUV data) and transmit the encoded data to an external device (e.g., electronic device 102, electronic device 104, or server 106) through a communication interface 160.

Figure 10:
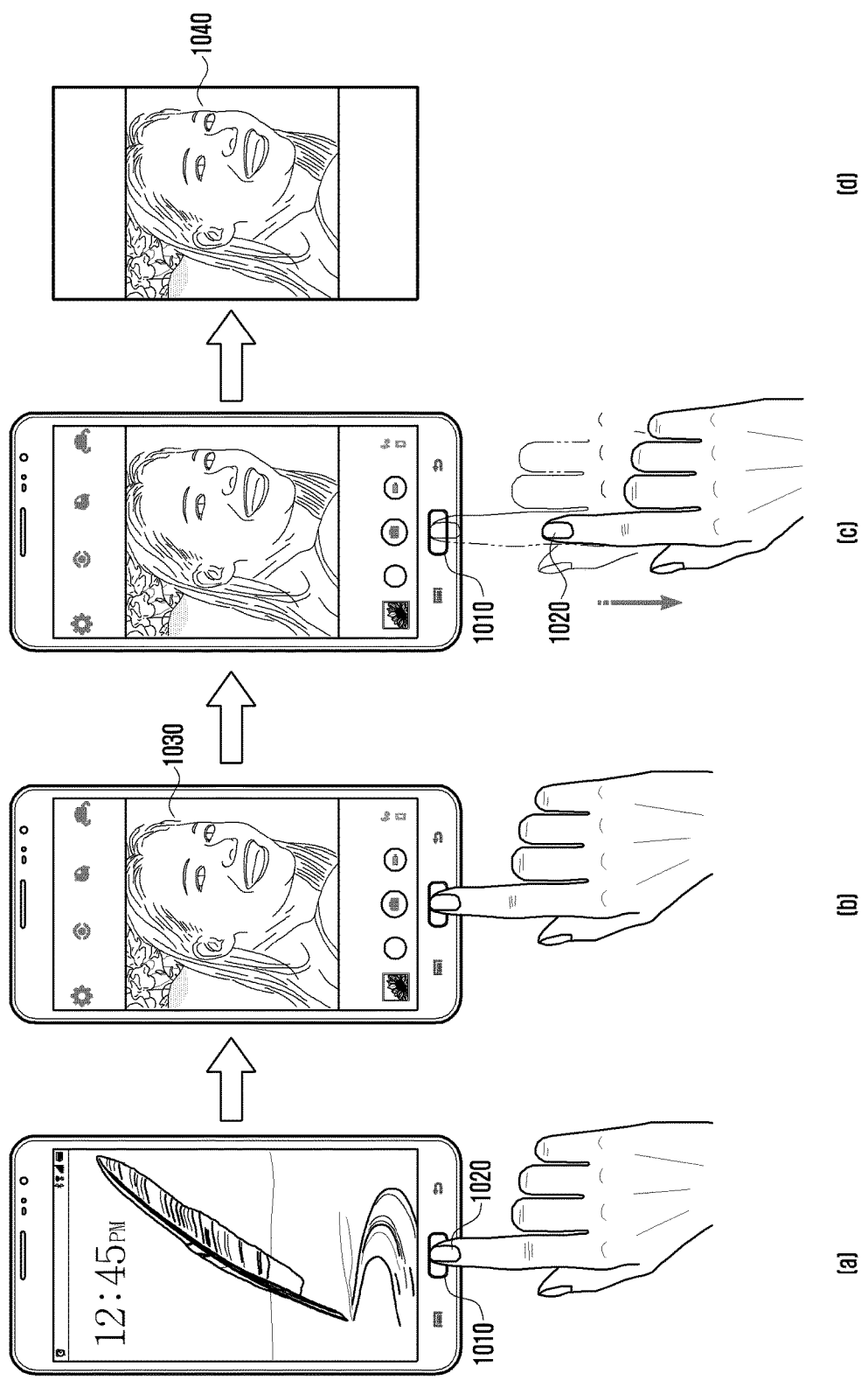
FIG. 10 illustrates a user interface screen of an electronic device for performing a photographing method according to various embodiments.

FIG. 10 illustrates a user interface screen of an electronic device for performing a photographing method according to various embodiments.

With reference to FIG. 10(a), the electronic device (e.g., smartphone) can identify a gesture of an object through a key formed in an area physically separated from a touch screen (e.g., touch key 1010 formed under the touch screen) or from a partial area of the touch screen (e.g., part adjacent to the touch key 1010). Subsequently, the electronic device can determine whether the identified gesture is a preview command. For example, if the identified gesture is an operation that a finger 1020 touches the touch key 1010 two times, is taken off, and touches again, the electronic device can determine that a preview command is generated.

With reference to FIG. 10(b), in response to the preview command, the electronic device can acquire image data (e.g., RGB data) from a camera and display a corresponding image 1030 in the touch screen.

With reference to FIG. 10(c), the user can release the finger 1020 from the touch key 1010 while the image 1030 is being displayed.

With reference to FIG. 10(d), the electronic device can process and store image data 1040 in a memory in response to the release of the finger. Additionally or as an alternative of the storage operation, the processor 120 can encode the image data (e.g., YUV data) and transmit the encoded data to an external device (e.g., electronic device 102, electronic device 104, or server 106) through a communication interface 160.

Figure 11:
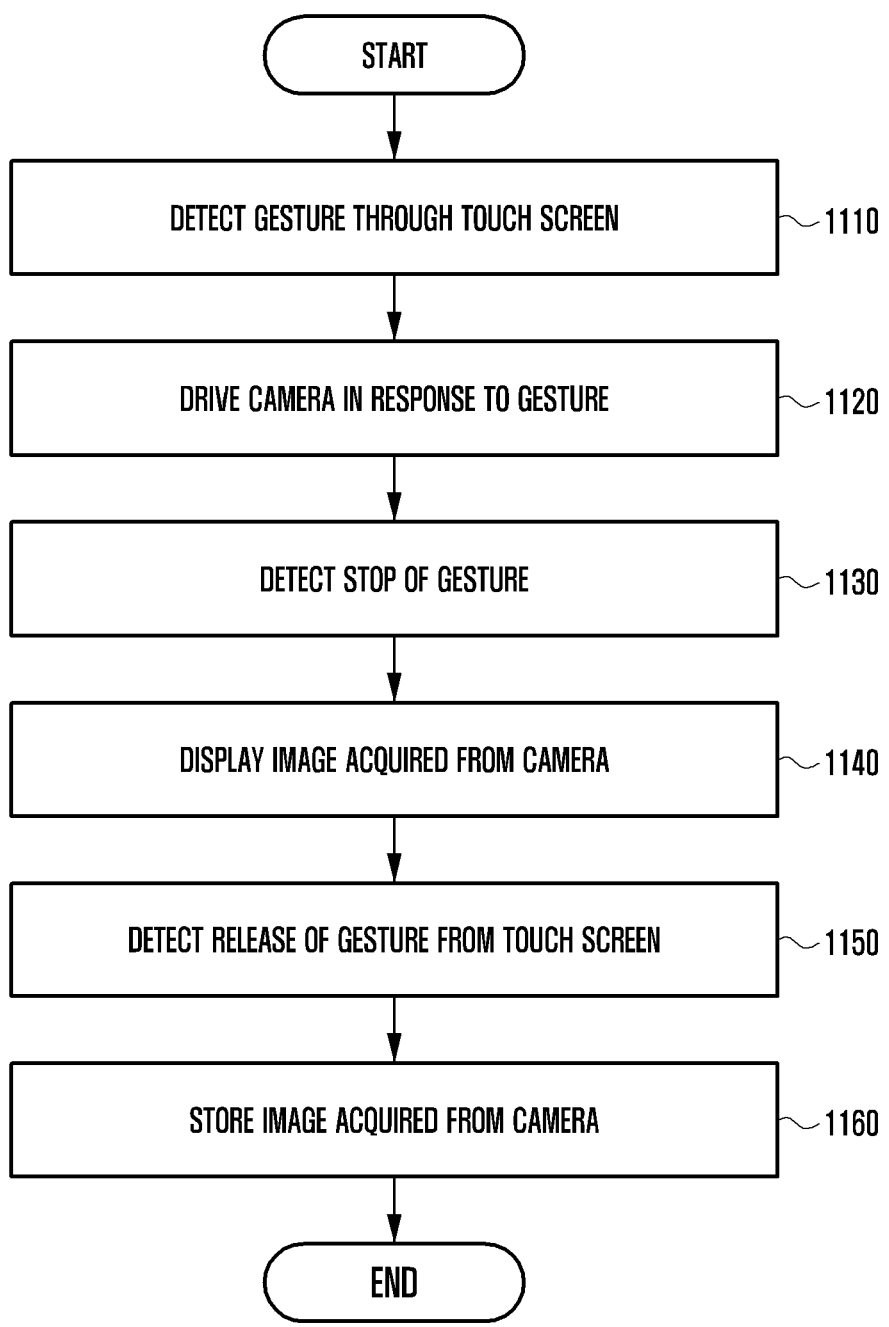
FIG. 11 illustrates a photographing method according to another embodiment.

FIG. 11 illustrates a photographing method according to another embodiment. The photographing method can be performed when a display 150 of an electronic device 101 is in a switched-off state or a predetermined screen is displayed in the display 150.

With reference to FIG. 11, at operation 1110, the processor 120 may detect a gesture through a touch screen (e.g., display 150).

At operation 1120, the processor 120 may drive a camera in response to the gesture. For example, if the gesture is detected, the processor 120 can command a power management module 180 to supply electric power to a camera module 170. Accordingly, the power management module 180 can supply the electric power to the camera module 170, and the camera module 170 can generate image data and transmit the image data to the processor 120.

At operation 1130, the processor 120 may detect a stop of the gesture from the touch screen.

At operation 1140, the processor 120 may control the display 150 to display an image acquired from the camera in response to the stop of the gesture. For example, the processor 120 can process the image data received from the camera module 170 to display data and transmit the display data to the display 150.

At operation 1150, the processor 120 may detect a release of a gesture from the touch screen.

At operation 1160, the processor 120 stores the image acquired from the camera in a memory 130 in response to the release of the gesture. For example, the processor 120 can encode the image data received from the camera module 170 and transmit the encoded data to the memory 130.

Figure 12:
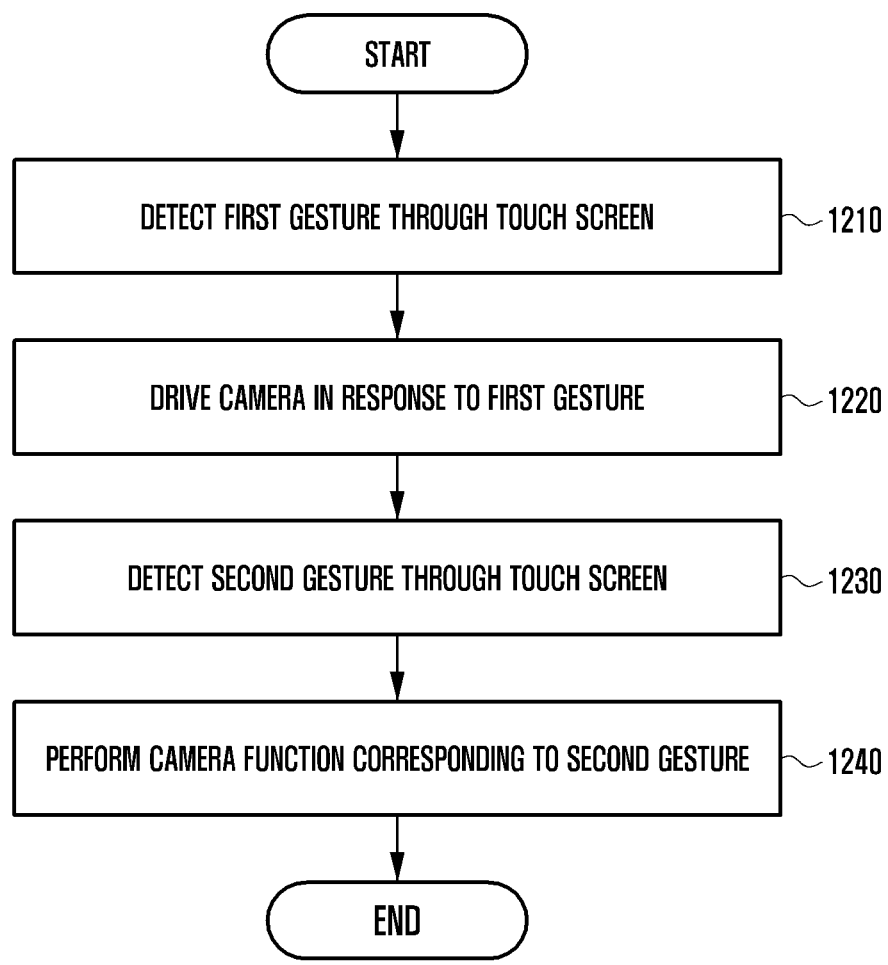
FIG. 12 illustrates a method for operating a camera according to an embodiment.

FIG. 12 illustrates a method for operating a camera according to an embodiment.

With reference to FIG. 12, at operation 1210, the processor 120 may detect a first gesture through a touch screen (e.g., display 150).

At operation 1220, the processor 120 may drive a camera in response to the first gesture.

At operation 1230, the processor 120 may detect a second gesture from the touch screen. According to an embodiment, after the camera is driven in response to the first gesture, if an object (e.g., finger or pen) continues to remain on the touch screen (e.g., if the object stops on the touch screen or an attribute (e.g., direction and speed) of the first gesture changes), the continuance of the object may be identified as a second gesture. According to another embodiment, after releasing the first gesture from the touch screen, the processor 120 can detect a new gesture from the touch screen. Namely, the new gesture may be identified as the second gesture.

At operation 1240, the processor 120 may perform a camera function corresponding to the second gesture. In an embodiment, if the second gesture is identified, the processor 120 can control a display 150 to display an image acquired from the camera. Additionally or alternatively, the processor 120 can store the image acquired from the camera in a memory 130. In another embodiment, camera functions to be performed may vary depending on an attribute of the second gesture. The processor 120 can receive information indicating a second gesture from the touch screen and identify the attribute of the second gesture by processing the information. The identified attribute may include information indicating a direction, information indicating time, or information of a corresponding object. In more detail, the attribute may include a direction of an object moving on a touch screen, contacting or hovering time of an object on a touch screen, distance (depth) between an object and a touch screen, number of objects contacting or hovering over a touch screen, type of object contacting or hovering over a touch screen (e.g., finger or pen), and hand in use (namely, information indicating with which hand a user performs a gesture). The processor 120 can search a function corresponding to the identified attribute from a lookup table stored in the memory 130 and perform the identified camera function (e.g., still shot, moving image shot, or change of photographing mode).

According to an embodiment, the operation 1240 may be replaced by another operation. For example, if the second gesture is identical to the first gesture except a moving direction, the processor 120 can stop the camera drive (e.g., image capture). For example, the first gesture may be an operation that the user moved an object in a lower direction on the touch screen, and the second gesture may be an operation that the user moved the object in an upper direction.

Figure 13:
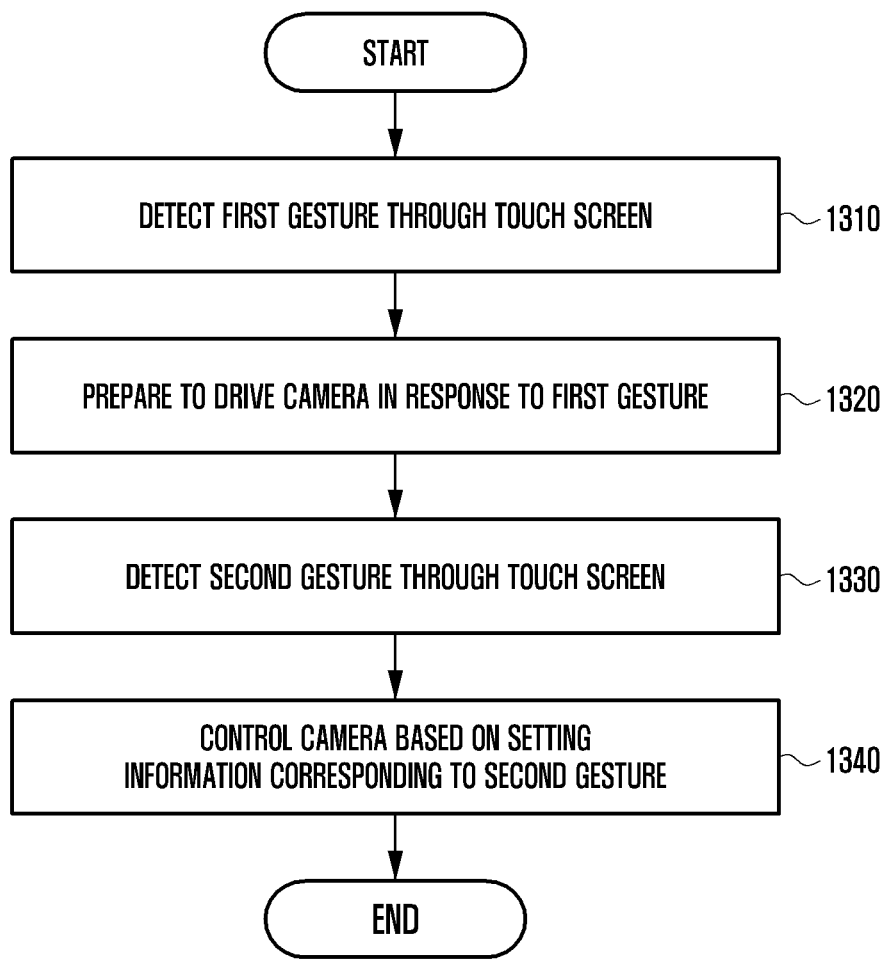
FIG. 13 illustrates a method for operating a camera according to another embodiment.

FIG. 13 illustrates a method for operating a camera according to another embodiment.

With reference to FIG. 13, at operation 1310, the processor 120 may detect a first gesture through a touch screen (e.g., display 150).

At operation 1320, the processor 120 may prepare to drive a camera in response to the first gesture. For example, if the first gesture is detected, the processor 120 can command a power management module 180 to supply electric power to an image sensor of the camera. Accordingly, the power management module 180 can supply electric power to the image sensor.

At operation 1330, the processor 120 may detect a second gesture through the touch screen.

At operation 1340, the processor 120 may control the camera based on setting information corresponding to the second gesture. In an embodiment, the camera setting information (e.g., AE (Auto Exposure), AWB (Auto White Balance), AF (Auto Focus), and ISO (International Organization for Standardization) sensitivity, shutter speed, aperture value, and zoom magnification) may vary according to an attribute of the second gesture. The processor 120 can search setting information corresponding to the identified attribute from a lookup table stored in the memory 130 and transmit the identified setting information to the camera (e.g., internal memory (volatile memory) of camera). Accordingly, the camera can acquire the setting information by accessing to the internal memory and perform an operation of generating an image with the image sensor based on the setting information. According to this embodiment, a user can set the camera with a desired photographing condition by operating the touch screen. Namely, the camera setting condition may vary according to a moving direction, moving distance, and trace type of the object. For example, if the moving direction of the second gesture changes from a lower side to a right side, an exposure may increase proportionally to a movement distance from a change point. If the moving direction of the second gesture changes from a lower side to a left side, an exposure may decrease proportionally to a movement distance from a change point second gesture. In the case that the moving direction and the trace type of the second gesture are circular in a clockwise direction, the shutter speed may increase; and in the case of a counter-clockwise direction, the shutter speed may decrease.

Figure 14:
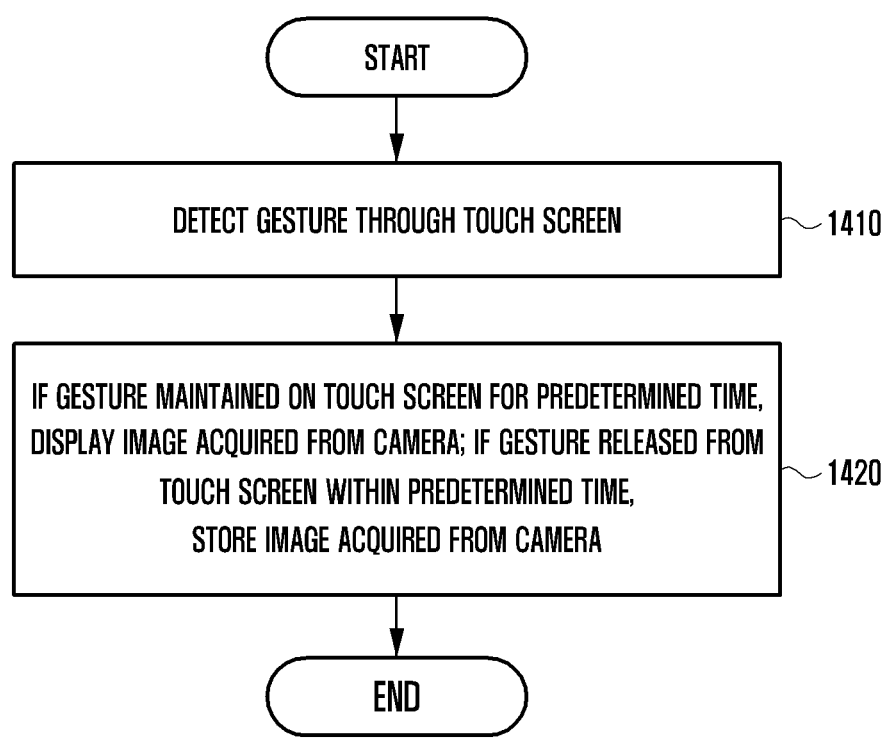
FIG. 14 illustrates a method for operating a camera according to another embodiment.

FIG. 14 illustrates a method for operating a camera according to another embodiment.

With reference to FIG. 14, at operation 1410, the processor 120 may detect a gesture through a touch screen (e.g., display 150). In an embodiment, a camera (e.g., camera module 170) can be driven in response to the detection of a gesture. In another embodiment, the camera can be driven before the detection of a gesture, and the display 150 may be in a switched-off state or in a state of displaying a predetermined screen (e.g., home screen or lock screen).

At operation 1420, the processor 120 may displays an image acquired from the camera if the gesture is maintained on the touch screen for more than a predetermined time (e.g., time count starts after a stop of a gesture, and if the time count exceeds a predetermined time without a release of the gesture), and stores the image acquired from the camera if the gesture is released from the touch screen within the predetermined time. In an embodiment, if the gesture is maintained on the touch screen for more than the predetermined time, the processor 120 can process image data received from the camera module 170 to display data and transmit the display data to the display 150. If the gesture is released from the touch screen within the predetermined time, the processor 120 can encode the image data received from the camera module 170 and transmit the encoded data to a memory 130.

A method for operating an electronic device may include the operations of acquiring a user input through a display; and, in response to acquiring the user input, displaying image information acquired through an image sensor through the display if the user input has a first input time, and storing the image information if the user input has a second input time.

The method may further include an operation of identifying an attribute of a user input acquired through the display and an operation of performing a function corresponding to the identified attribute. Here, the identified attribute may include at least one of information indicating a direction, information indicating time, and information related to an object contacting or hovering over the display.

The method may further include an operation of identifying an attribute of a user input acquired through the display and an operation of controlling the image sensor based on setting information corresponding to the identified attribute. Here, the identified attribute may include at least one of information indicating a direction, information indicating time, and information related to an object contacting or hovering over the display.

The method may further include an operation of driving the image sensor in response to a first user input acquired through the display and an operation of terminating the drive of the image sensor if an attribute of a second user input acquired through the display satisfies a predetermined condition. The operation of terminating the drive may include an operation of terminating the drive of the image sensor if a direction of the second user input is opposite to a direction of the first user input.

The operation of displaying may include the operations of transmitting a first drive command to the image sensor in response to a stop of a gesture on the display, receiving first data from the image sensor in response to the first drive command, generating processing data by processing the first data, converting the processing data to an image, and displaying the image. The operation of storing may include the operations of transmitting a second drive command to the images sensor in response to a release of a gesture, receiving second data from the image sensor in response to the second drive command, generating first processing data and second processing data having a greater capacity than the first processing data by processing the second data, converting the first processing data to an image, displaying the image, encoding the second processing data, and storing the encoded data.

Figure 15:
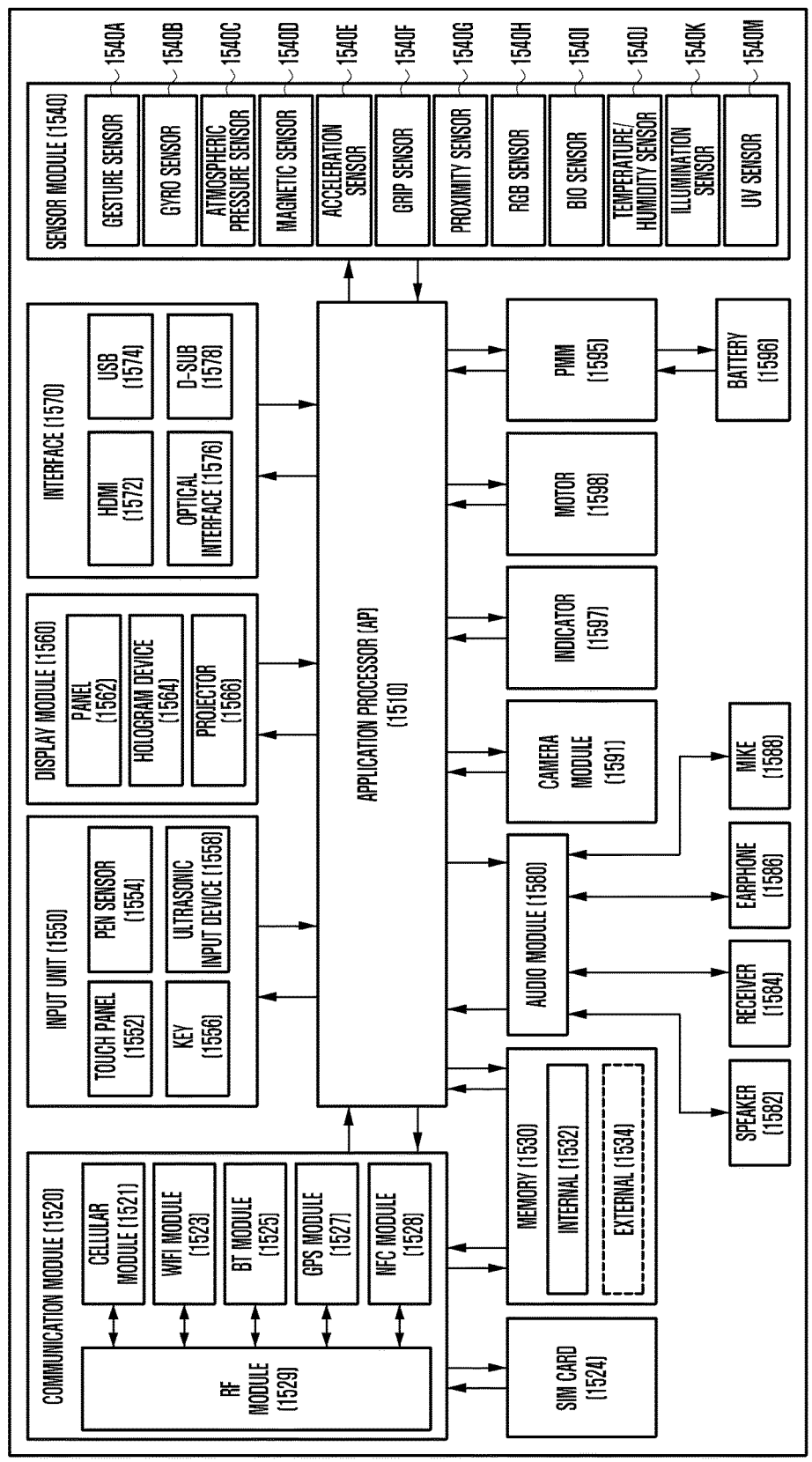
FIG. 15 is a block diagram illustrating a configuration of an electronic device according to various embodiments.

FIG. 15 is a detailed block diagram showing a configuration of an electronic device 1501 according to various embodiments. For example, the electronic device 1501 is capable of including part or all of the components in the electronic device 101 shown in FIG. 1. The electronic device 1501 is capable of including one or more processors 1510 (e.g., Application Processors (APs)), a communication module 1520, a Subscriber Identification Module (SIM) 1524, a memory 1530, a sensor module 1540, an input device 1550, a display 1560, an interface 1570, an audio module 1580, a camera module 1591, a power management module 1595, a battery 1596, an indicator 1597, and a motor 1598.

The processor 1510 is capable of driving, for example, an operating system or an application program to control a plurality of hardware or software components connected to the processor 1510, processing various data, and performing operations. The processor 1510 may be implemented as, for example, a System on Chip (SoC). According to an embodiment, the processor 1510 may further include a graphic processing unit (GPU) and/or an image signal processor. The processor 1510 may also include at least part of the components shown in FIG. 15, e.g., a cellular module 1521. The processor 1510 is capable of loading commands or data received from at least one of other components (e.g., a non-volatile memory) on a volatile memory, processing the loaded commands or data. The processor 1510 is capable of storing various data in a non-volatile memory.

The communication module 1520 may include the same or similar configurations as the communication interface 160 shown in FIG. 1. For example, the communication module 1520 is capable of including a cellular module 1521, WiFi module 1523, Bluetooth (BT) module 1525, GNSS module 1526 (e.g., a GPS module, Glonass module, Beidou module or Galileo module), NFC module 1527, and Radio Frequency (RF) module 1529.

The cellular module 1521 is capable of providing a voice call, a video call, an SMS service, an Internet service, etc., through a communication network, for example. According to an embodiment, the cellular module 1521 is capable of identifying and authenticating an electronic device 1501 in a communication network by using a subscriber identification module (SIM) 1524 (e.g., a SIM card). According to an embodiment, the cellular module 1521 is capable of performing at least part of the functions provided by the processor 1510. According to an embodiment, the cellular module 1521 is also capable of including a communication processor (CP).

Each of the WiFi module 1523, the BT module 1525, the GNSS module 1526, and the NFC module 1527 is capable of including a processor for processing data transmitted or received through the corresponding module. MST module is capable of including a processor for processing data transmitted or received through the corresponding module. According to embodiments, at least part of the cellular module 1521, WiFi module 1523, BT module 1525, GNSS module 1526, NFC module 1527, and MST module (e.g., two or more modules) may be included in one integrated chip (IC) or one IC package.

The RF module 1529 is capable of transmission/reception of communication signals, e.g., RF signals. The RF module 1529 is capable of including a transceiver, a power amp module (PAM), a frequency filter, a low noise amplifier (LNA), an antenna, etc. According to another embodiment, at least one of the following modules: cellular module 1521, WiFi module 1523, BT module 1525, GNSS module 1526, NFC module 1527, and MST module is capable of transmission/reception of RF signals through a separate RF module.

The SIM module 1524 is capable of including a card including a subscriber identification module (SIM) and/or an embodied SIM. The SIM module 1524 is also capable of containing unique identification information, e.g., integrated circuit card identifier (ICCID), or subscriber information, e.g., international mobile subscriber identity (IMSI).

The memory 1530 (e.g., memory 130 shown in FIG. 1) is capable of including a built-in memory 1532 or an external memory 1534. The built-in memory 1532 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 1534 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 1534 is capable of being connected to the electronic device 1501, functionally and/or physically, through various interfaces.

The memory 1530 is capable of storing payment information and a payment application serving as one of the application programs 154D. The payment information may refer to credit card numbers and PINs, corresponding to a credit card. The payment information may also include user authentication information, e.g., fingerprints, facial features, voice information, etc.

When the payment application is executed by the processor 1510, it may enable the processor 1510 to perform: an interaction with the user to make payment (e.g., displaying a screen to select a card (or a card image) and obtaining information (e.g., a card number) corresponding to a selected card (e.g., a pre-specified card) from payment information); and an operation to control magnetic field communication (e.g., transmitting the card information to an external device (e.g., a card reading apparatus) through the NFC module 1527 or MST module). The following description provides detailed embodiments with operations of the components described above, referring to FIG. 15C to FIG. 157.

The sensor module 1540 is capable of measuring/detecting a physical quantity or an operation state of the electronic device 1501, and converting the measured or detected information into an electronic signal. The sensor module 1540 is capable of including at least one of the following: a gesture sensor 1540A, a gyro sensor 1540B, an atmospheric pressure sensor 1540C, a magnetic sensor 1540D, an acceleration sensor 1540E, a grip sensor 1540F, a proximity sensor 1540G, a color sensor 1540H (e.g., a red, green and blue (RGB) sensor), a biometric sensor 15401, a temperature/humidity sensor 1540J, an illuminance sensor 1540K, and a ultraviolet (UV) sensor 1540M. Additionally or alternatively, the sensor module 1540 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 1540 is capable of further including a control circuit for controlling one or more sensors included therein. In embodiments, the electronic device 1501 is capable of including a processor, configured as part of the processor 1510 or a separate component, for controlling the sensor module 1540. In this case, while the processor 1510 is operating in sleep mode, the processor is capable of controlling the sensor module 1540.

The input unit 1550 may include, for example, a touch panel 1552, a digital pen sensor 1554, a key 1556, or an ultrasonic input unit 1558. The touch panel 1552 may use, for example, at least one of a capacitive type, a resistive type, an infrared type, and an ultrasonic type. Also, the touch panel 1552 may further include a control circuit. The touch panel 1552 may further include a tactile layer to offer a tactile feedback to a user. According to an embodiment, the touch panel 1552 may include a pressure sensor (or a force sensor) capable of measuring the strength or pressure of a user's touch. This pressure sensor may be formed integrally with or separately from the touch panel 1552.

The digital pen sensor 1554 may be a part of the touch panel or include a separate sheet for recognition. The key 1556 may include, for example, a physical button, an optical key, or a keypad. The ultrasonic input unit 1558 may detect ultrasonic waves occurring at an input tool through a microphone (e.g., 1588) and thereby identify data corresponding to the detected ultrasonic waves.

The display 1560 is capable of including a panel 1562, a hologram unit 1564, or a projector 1566. The panel 1562 may include the same or similar configurations as the display 150 shown in FIG. 1. The panel 1562 may be implemented to be flexible, transparent, or wearable. The panel 1562 may also be incorporated into one module together with the touch panel 1552. The hologram unit 1564 is capable of showing a stereoscopic image in the air by using light interference. The projector 1566 is capable of displaying an image by projecting light onto a screen. The screen may be located inside or outside of the electronic device 1501. According to an embodiment, the display 1560 may further include a control circuit for controlling the panel 1562, the hologram unit 1564, or the projector 1566.

The interface 1570 is capable of including a high-definition multimedia interface (HDMI) 1572, a universal serial bus (USB) 1574, an optical interface 1576, or a D-subminiature (D-sub) 1578. The interface 1570 may be included in the communication interface 160 shown in FIG. 1. Additionally or alternatively, the interface 1570 is capable of including a mobile high-definition link (MHL) interface, a secure digital (SD) card/multimedia card (MMC) interface, or an infrared data association (IrDA) standard interface.

The audio module 1580 is capable of providing bidirectional conversion between a sound and an electronic signal. At least part of the components in the audio module 1580 may be included in the input/output interface 140 shown in FIG. 1. The audio module 1580 is capable of processing sound information input or output through a speaker 1582, a receiver 1584, earphones 1586, microphone 1588, etc.

The camera module 1591 refers to a device capable of taking both still and moving images. According to an embodiment, the camera module 1591 is capable of including one or more image sensors (e.g., a front image sensor or a rear image sensor), a lens, an image signal processor (ISP), a flash (e.g., an LED or xenon lamp), etc.

The power management module 1595 is capable of managing power of the electronic device 1501. According to an embodiment, the power management module 1595 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 1596. The battery 1596 takes the form of either a rechargeable battery or a solar battery.

The indicator 1597 is capable of displaying a specific status of the electronic device 1501 or a part thereof (e.g., the processor 1510), e.g., a boot-up status, a message status, a charging status, etc. The motor 1598 is capable of converting an electrical signal into mechanical vibrations, such as, a vibration effect, a haptic effect, etc. Although not shown, the electronic device 1501 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo℧, etc.

Each of the elements described in the present disclosure may be formed with one or more components, and the names of the corresponding elements may vary according to the type of the electronic device. In various embodiments, the electronic device may include at least one of the above described elements described in the present disclosure, and may exclude some of the elements or further include other additional elements. Further, some of the elements of the electronic device according to various embodiments may be coupled to form a single entity while performing the same functions as those of the corresponding elements before the coupling.

Figure 16:
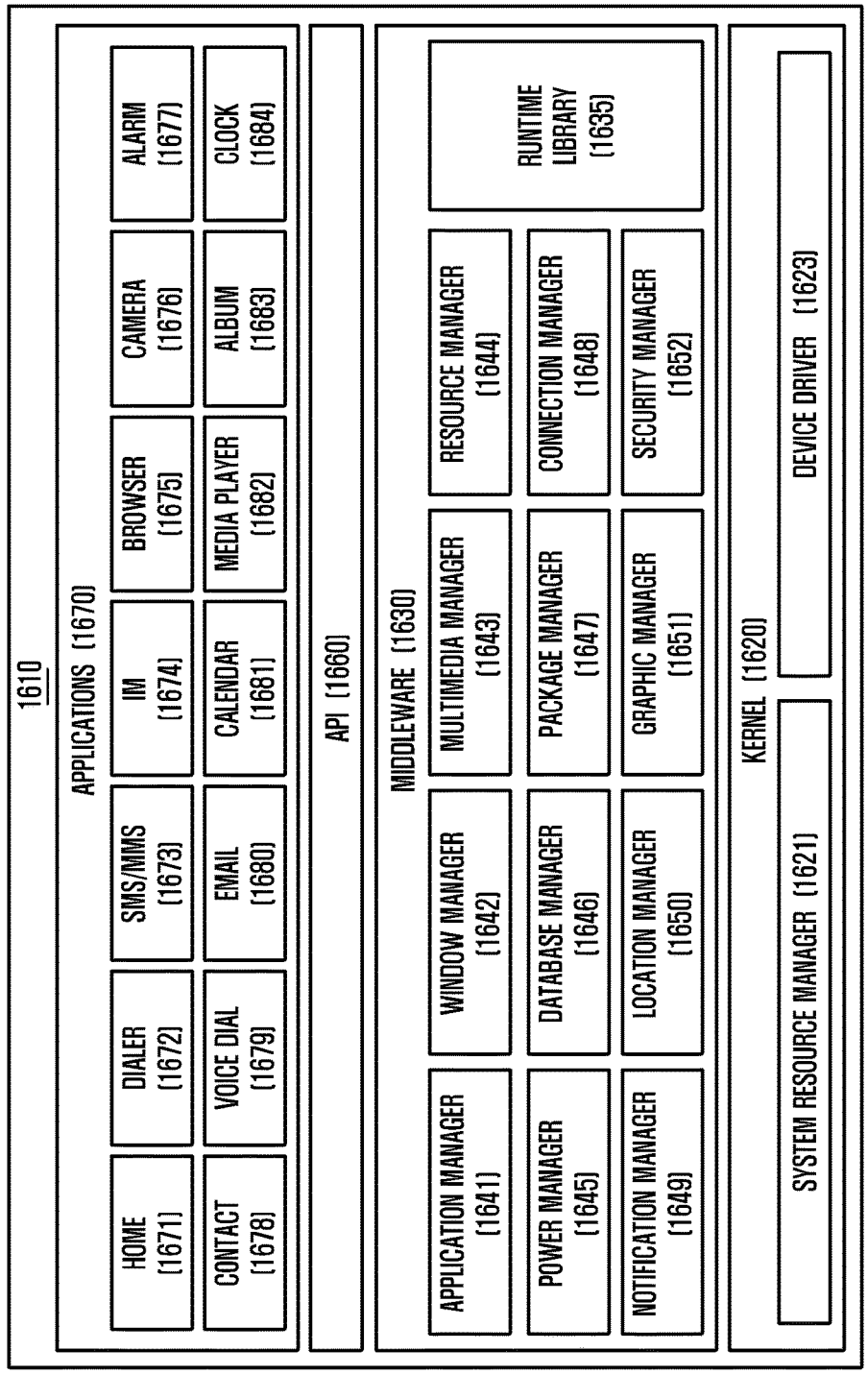
FIG. 16 is a block diagram illustrating a configuration of a program module according to various embodiments.

FIG. 16 is a block diagram of a programming module according to various embodiments. According to an embodiment, the program module 1610 (e.g., programs 131-134 shown in FIG. 1) is capable of including an operation system (OS) for controlling resources related to the electronic device (e.g., electronic device 101) and/or various applications (e.g., application programs 134 shown in FIG. 1) running on the OS. The OS may be Android, iOS, Windows, Symbian, Tizen, Bada, etc.

The program module 1610 is capable of including a kernel 1620, middleware 1630, application programming interface (API) 1660 and/or applications 1670. At least part of the program module 1610 may be preloaded on the electronic device or downloaded from a server (e.g., an electronic device 102 or 104, server 106, etc.).

The kernel 1620 (for example, kernel 14A) may include a system resource manager 1621 and/or a device driver 1623. The system resource manager 1621 may include, for example, a process manager, a memory manager, and a file system manager. The system resource manager 1621 may perform a system resource control, allocation, and recall. The device driver 1623 may include, for example, a display driver, a camera driver, a Bluetooth driver, a shared memory driver, a USB driver, a keypad driver, a WiFi driver, and an audio driver. Further, according to an embodiment, the device driver 1612 may include an Inter-Process Communication (IPC) driver.

The middleware 1630 may provide a function required in common by the applications 1670. Further, the middleware 1630 may provide a function through the API 1660 to allow the applications 1670 to efficiently use limited system resources within the electronic device. According to an embodiment, the middleware 1630 (for example, the middleware 14B) may include at least one of a runtime library 1635, an application manager 1641, a window manager 1642, a multimedia manager 1643, a resource manager 1644, a power manager 1645, a database manager 1646, a package manager 1647, a connection manager 1648, a notification manager 1649, a location manager 1650, a graphic manager 1651, and a security manager 1652.

The runtime library 1635 may include, for example, a library module used by a complier to add a new function through a programming language while the applications 1670 are executed. According to an embodiment, the runtime library 1635 executes input and output, management of a memory, a function associated with an arithmetic function and the like.

The application manager 1641 may manage, for example, a life cycle of at least one of the applications 1670. The window manager 1642 may manage GUI resources used on the screen. The multimedia manager 1643 may detect a format required for reproducing various media files and perform an encoding or a decoding of a media file by using a codec suitable for the corresponding format. The resource manager 1644 manages resources such as a source code, a memory, or a storage space of at least one of the applications 1670.

The power manager 1645 may operate together with a Basic Input/Output System (BIOS) to manage a battery or power and provides power information required for the operation. The database manager 1646 may manage generation, search, and change of a database to be used by at least one of the applications 1670. The package manager 1647 may manage an installation or an update of an application distributed in a form of a package file.

The connection manager 1648 may manage, for example, a wireless connection such as WiFi or Bluetooth. The notification manager 1649 may display or notify a user of an event such as an arrival message, an appointment, a proximity alarm or the like, in a manner that does not disturb the user. The location manager 1650 may manage location information of the electronic device. The graphic manager 1651 may manage a graphic effect provided to the user or a user interface related to the graphic effect. The security manager 1652 provides a general security function required for a system security or a user authentication. According to an embodiment, when the electronic device (for example, the electronic device 11) has a call function, the middleware 1630 may further include a telephony manager for managing a voice of the electronic device or a video call function.

The middleware 1630 is capable of including modules configuring various combinations of functions of the above described components. The middleware 1630 is capable of providing modules specialized according to types of operation systems to provide distinct functions. The middleware 1630 may be adaptively configured in such a way as to remove part of the existing components or to include new components.

The API 1660 (for example, API 133) may be a set of API programming functions, and may be provided with a different configuration according to an operating system. For example, in Android or iOS, a single API set may be provided for each platform. In Tizen, two or more API sets may be provided.

The applications 1670 (e.g., application programs 14D) may include one or more applications for performing various functions, e.g., home 1671, diary 1672, SMS/MMS 1673, instant message (IM) 1674, browser 1675, camera 1676, alarm 1677, context 1678, voice dial 1679, email 1680, calendar 1681, media player 1682, album 1683, clock 1684, health care (e.g., an application for measuring amount of exercise, blood sugar level, etc.), and environment information (e.g., an application for providing atmospheric pressure, humidity, temperature, etc.).

According to an embodiment, the applications 1670 are capable of including an application for supporting information exchange between an electronic device (e.g., electronic device 161) and an external device (e.g., electronic devices 162 and 164), which is hereafter called 'information exchange application'). The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, etc.) to external devices (e.g., electronic devices 162 and 164). In addition, the notification relay application is capable of receiving notification information from external devices to provide the received information to the user.

The device management application is capable of managing (e.g., installing, removing or updating) at least one function of an external device (e.g., electronic devices 162 and 164) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment, the applications 1670 are capable of including an application (e.g., a health care application of a mobile medical device, etc.) specified attributes of an external device (e.g., electronic devices 102 and 104). According to an embodiment, the applications 1670 are capable of including applications received from an external device (e.g., a server 106, electronic devices 102 and 104). According to an embodiment, the applications 1670 are capable of including a preloaded application or third party applications that can be downloaded from a server. It should be understood that the components of the program module 1610 may be called different names according to types of operating systems.

According to various embodiments, at least part of the program module 1610 can be implemented with software, firmware, hardware, or any combination of two or more of them. At least part of the program module 1610 can be implemented (e.g., executed) by a processor (e.g., processor 120). At least part of the programing module 1610 may include modules, programs, routines, sets of instructions or processes, etc., in order to perform one or more functions.

Figure 17:
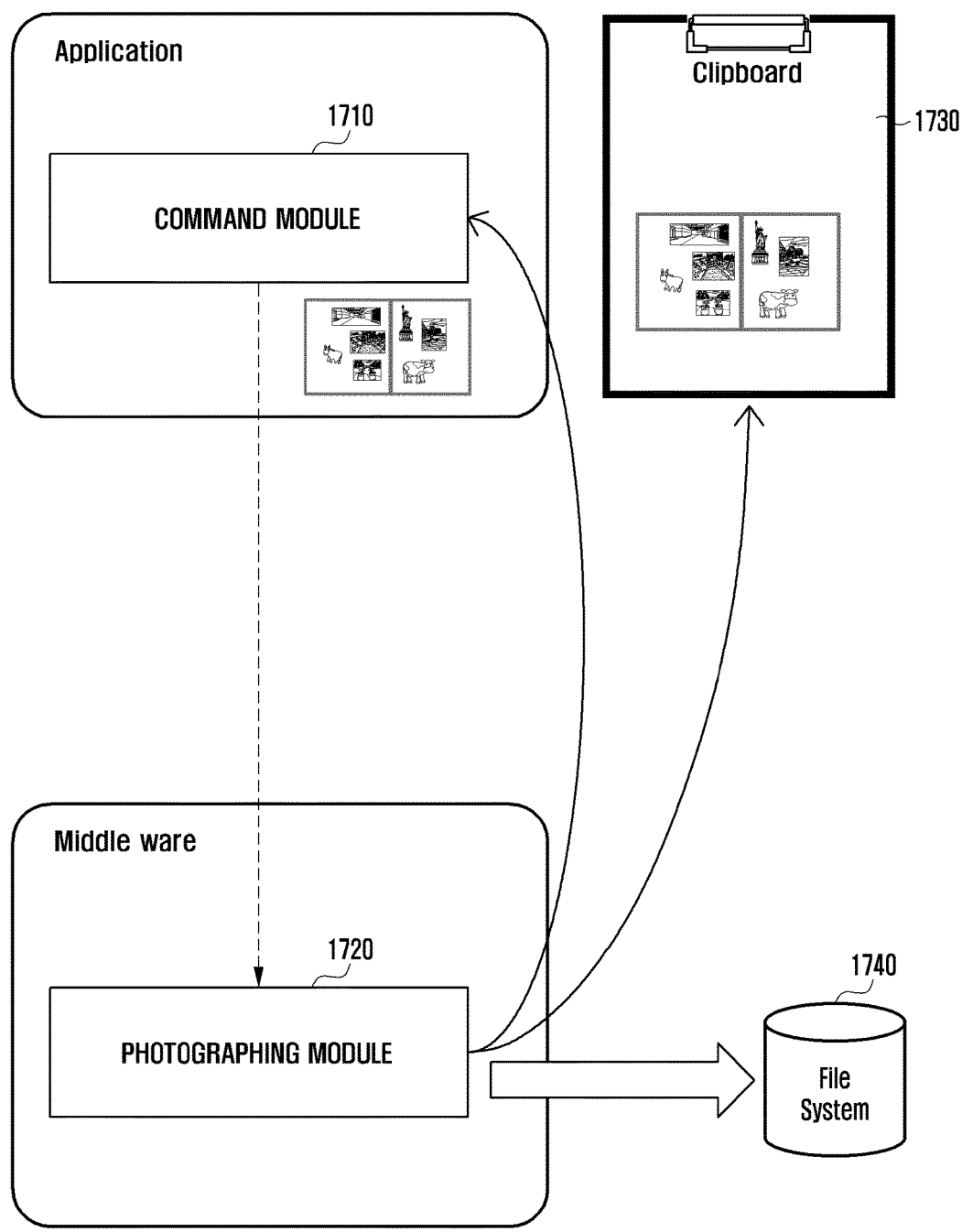
FIG. 17 is a block diagram illustrating a configuration of a program module according to various embodiments.

FIG. 17 is a block diagram illustrating a configuration of a program module 1700 according to various embodiments.

With reference to FIG. 17, the program module 1700 may include a command module 1710 and a photographing module 1720.

The command module 1710 shown in FIG. 17 may be a component of an application 1670. For example, the command module 1710 may configure a part of a home 1671 or an IM (Instant Messenger) 1674. For example, if a user gesture is input to an electronic device through a touch screen while an IM screen is being displayed, the gesture can be transmitted to the IM 1674 through an operating system of the electronic device. The command module 1710 can identify the input gesture as a photographing command Accordingly, the command module 1710 can control the photographing module 1720 to take a photo.

For example, the photographing module 1720 may be configured as a part of an application manager 1641 of a middleware 1630 shown in FIG. 16. In response to the photographing command, the photographing module 1720 can perform the following functions. First, the photographing module 1720 can acquire image data (e.g., RGB data) from a camera. The photographing module 1720 can generate first YUV data by resizing the image data to a smaller size and changing a color expression from RGB to YUV.

The photographing module 1720 can transmit the first YUV data to the IM 1674. The IM 1674 can perform a function of transmitting the first YUV data (or encoded data) to an external device in response to generation of a user transmission command (or without generation of the transmission command). Additionally or as an alternative to the function of transmitting the first YUV data to the IM 1674, the photographing module 1720 can store the first YUV data in a clipboard 1730. In response to generation of a user's copy command, the application 1670 can use the first YUV data stored in the clipboard 1730. For example, the IM 1674 may include the first YUV data stored in the clipboard 1730 in a send message.

Additionally, the photographing module 1720 can generate second YUV data by changing a color expression of the acquired image data from RGB to YUV, encode the second YUV data, and store the encoded data in a file system 1740.

The term "module" used in the present invention means a unit including at least one of hardware, software, firmware, or their combinations. For example the "module" can be used interchangeably with the terms of a unit, logic, logical block, component, or circuit. The "module" can be configured in a mechanical form or an electronical form. For example, the "module" according to the present invention may include at least one of an application-specific integrated circuit (ASIC) chip, field-programmable gate arrays (FPGAs), or programmable-logic device for executing certain operations, which are well known already or will be developed in future.

At least one part of the device (e.g., modules or their functions) or method (e.g., operations) according to various embodiments can be implemented by a command stored in computer-readable storage media in a program module form. If the command is executed by at least one processor, the processor can perform a function of the corresponding command. The computer-readable storage media may be a memory 130. At least one part of the programing module can be implemented by a processor. At least one part of the programing module may include a module, program, set of instructions, or process in order to perform at least one function.

The computer-readable storage media may include a hard disk, floppy disk, magnetic media (e.g., magnetic tape), optical media (e.g., compact disc read only memory (CD-ROM) and digital versatile disc (DVD)), magneto-optical media (e.g., floptical disk), and hardware device (e.g., read only memory (ROM), random access memory (RAM), or flash memory). Further, the command may include a high level language code executable by a computer using an interpreter as well as a machine language code created by a compiler. The hardware device can be configured with at least one software module to perform operations according to various embodiments, or vice versa.

A module or a program module according to various embodiments may include at least one of the aforementioned components, some of them may be omitted, or other additional components may be included. Operations according to various embodiments can be executed sequentially, parallel, repeatedly, or in a heuristic method by the module, program module, or other components. Further some of the operations can be executed in a different sequence or omitted, or other additional operations can be added.

Although embodiments of the invention have been described in detail hereinabove, it should be understood that many variations and modifications of the basic inventive concept described herein will still fall within the spirit and scope of the disclosure as defined in the appended claims.

The invention claimed is:

1. An electronic device comprising:
    an image sensor;
    a display comprising a touchscreen; and
    a processor functionally connected to the image sensor and the display, wherein the processor is configured to,
        while the display is in an inactive state or is displaying a screen not corresponding to a camera application,
        in response to a stop of a user input on the touch screen, being a stop of an object moving in a state of contacting or hovering over the touch screen, transmit a first drive command to the image sensor, receive first data from the image sensor as a response to the first drive command, generate processing data by processing the first data, and control the display to display the processing data by converting the processing data to an image; and
        in response to a release of the user input, being a release of contact between an object and the touch screen or the release of a hovering object, transmit a second drive command to the image sensor, receive second data from the image sensor as a response to the second drive command, generate first processing data and second processing data having a greater capacity than the first processing data by processing the second data, control the display to display the first processing data by converting the first processing data to an image, encode the second processing data, and store the encoded data.

2. The electronic device of claim 1,
    wherein the processor is further configured to identify an attribute of the user input acquired through the display and to perform a function corresponding to the identified attribute, and
    wherein the identified attribute comprises at least one of information indicating a direction, information indicating time, or information related to the object contacting or hovering over the display.

3. The electronic device of claim 2, wherein the identified attribute further comprises information indicating which hand of a user performed the user input.

4. The electronic device of claim 1,
wherein the processor is further configured to identify an attribute of the user input acquired through the display, and to control the image sensor based setting information corresponding to the identified attribute, and
wherein the identified attribute comprises at least one of information indicating a direction, information indicating time, and information related to the object contacting or hovering over the display.

5. The electronic device of claim 1, wherein the processor is further configured to drive the image sensor in response to a first user input acquired through the display, and to terminate the driving of the image sensor when an attribute of a second user input acquired through the display satisfies a predetermined condition.

6. The electronic device of claim 5, wherein the processor is further configured to terminate the driving of the image sensor when a direction of the second user input is opposite to a direction of the first user input.

7. The electronic device of claim 1,
wherein the generating of the first processing data by the processor comprises reducing a size of the received data and converting a color expression of the received data from RGB to YUV, and
wherein the generating of the second processing data by the processor comprises converting the color expression of the received data from RGB to YUV.

8. The electronic device of claim 1, wherein the processor is further configured to transmit the first processing data or encoded data of the first processing data to an external device in response to the release of a gesture.

9. The electronic device of claim 1, further comprising a flashlight,
wherein the processor is further configured to control the flashlight to emit light at the time of transmitting the second drive command.

10. An electronic device comprising:
an image sensor;
a display comprising a touchscreen; and
a processor functionally connected to the image sensor and the display,
wherein the processor is configured to:
acquire a gesture through the touchscreen while the display is in an inactive state; and
in response to a release of the gesture on the touchscreen, transmit a drive command to the image sensor, receive data from the image sensor as a response to the drive command, generate first processing data and second processing data having a greater capacity than the first processing data by processing the data, control the display to display the first processing data by conversion to an image, encode the second processing data, and store the encoded data.

11. The electronic device of claim 10,
wherein the generating of the first processing data by the processor comprises reducing a size of the received data and converting a color expression of the received data from RGB to YUV, and
wherein the generating of the second processing data by the processor comprises converting the color expression of the received data from RGB to YUV.

12. The electronic device of claim 10, further comprising a flashlight,
wherein the processor is further configured to control the flashlight to emit light at the time of transmitting the drive command.

13. The electronic device of claim 10, further comprising an input device, the input device comprising a key formed in at least one part of a touch panel installed in the display or in an area separated physically from the display.

14. The electronic device of claim 10,
wherein the processor is further configured to:
control the display to display a user interface screen in order for a message to be transmitted to and to be received from an external device, and
in response to a release of the gesture received from the touchscreen while displaying the user interface screen, transmit a drive command to the image sensor, receive data from the image sensor as a response to the drive command, generate processing data by processing the data, and transmit the processing data or encoded data of the processing data to the external device through a communication module.

15. A method for operating an electronic device, the method comprising:
while a display of the electronic device is in an inactive state or is displaying a screen not corresponding to a camera application;
in response to a stop of a user input on a touch screen of the display, being a stop of an object moving in a state of contacting or hovering over the touch screen, transmitting a first drive command to an image sensor, receiving first data from the image sensor as a response to the first drive command, generating processing data by processing the first data, and controlling the display to display the processing data by converting the processing data to an image; and
in response to a release of the user input, being a release of contact between an object and the touch screen or the release of a hovering object, transmitting a second drive command to the image sensor, receiving second data from the image sensor as a response to the second drive command, generating first processing data and second processing data having a greater capacity than the first processing data by processing the second data, controlling the display to display the first processing data by converting the first processing data to an image, encoding the second processing data, and storing the encoded data.

* * * * *